Dec. 22, 1959  W. F. STREMKE ET AL  2,917,886
SEMI-AUTOMATIC WRAPPING MACHINES
Original Filed Nov. 19, 1956  6 Sheets-Sheet 3

INVENTORS
William F. Stremke,
William F. Stremke Jr.,
Roman R. Pazderski
BY
Cyril M. Hajewski
Attorney.

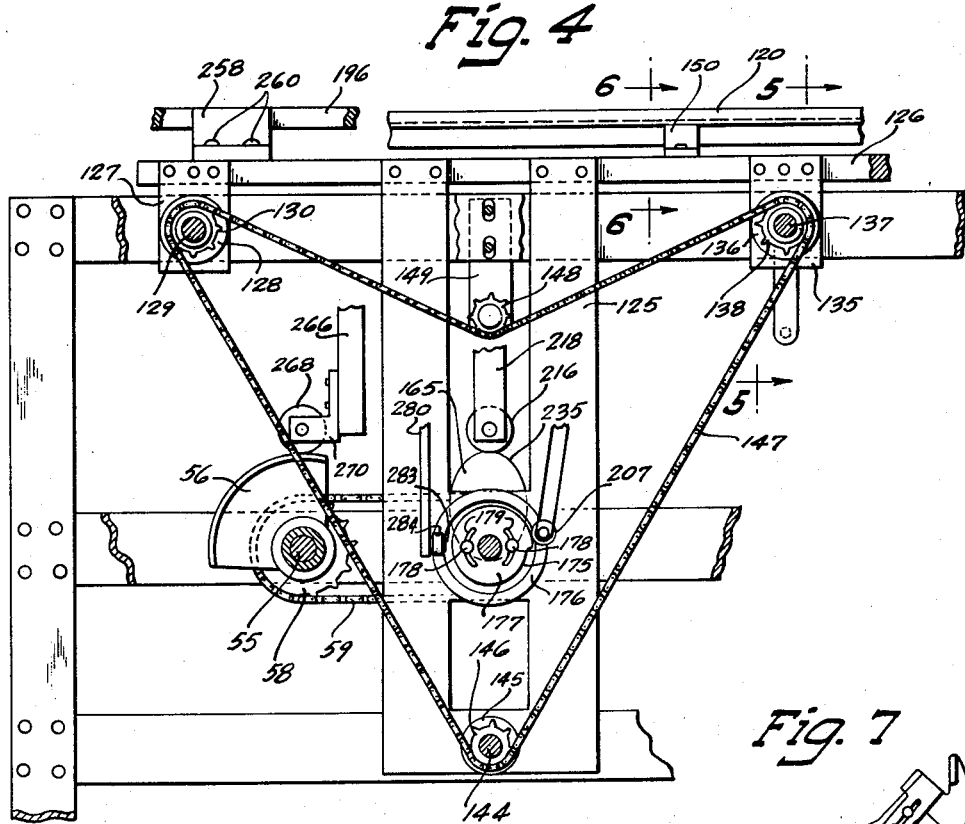
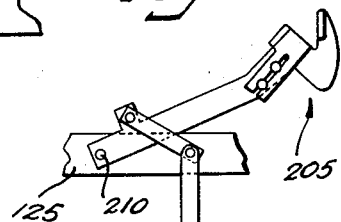
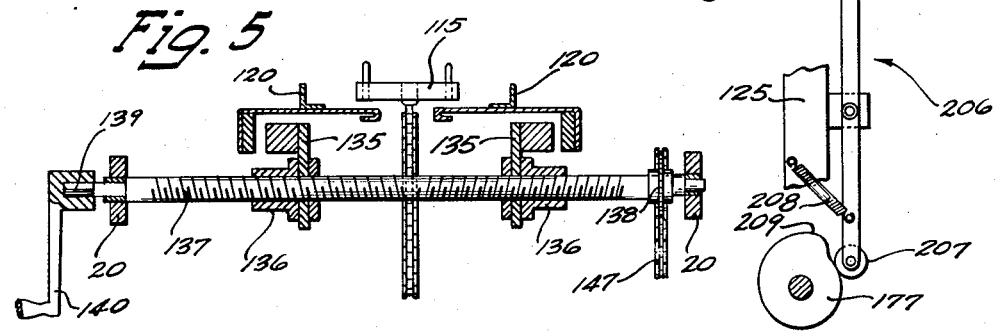
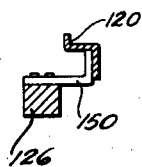

Dec. 22, 1959 W. F. STREMKE ET AL 2,917,886
SEMI-AUTOMATIC WRAPPING MACHINES
Original Filed Nov. 19, 1956 6 Sheets-Sheet 5
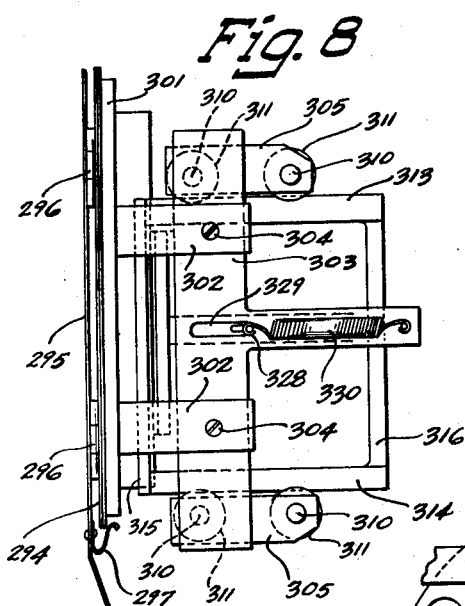
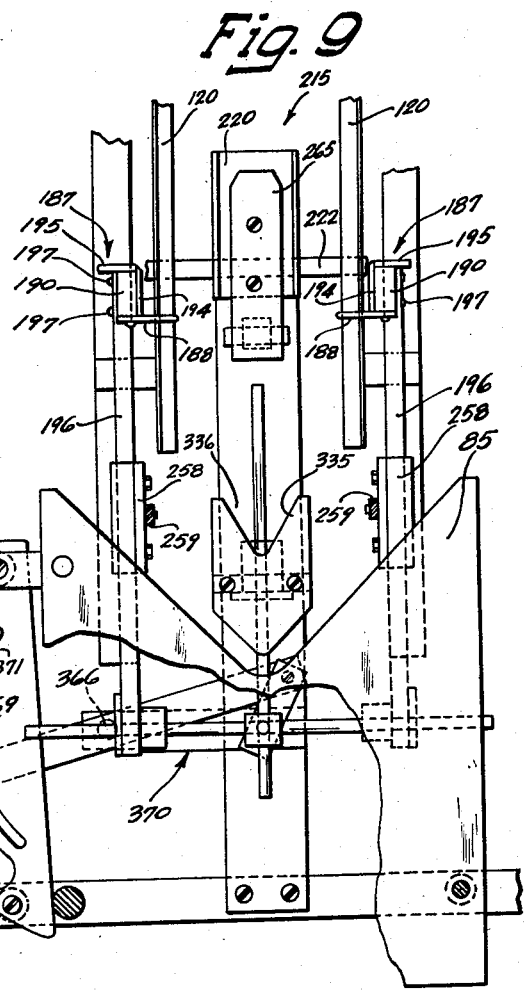
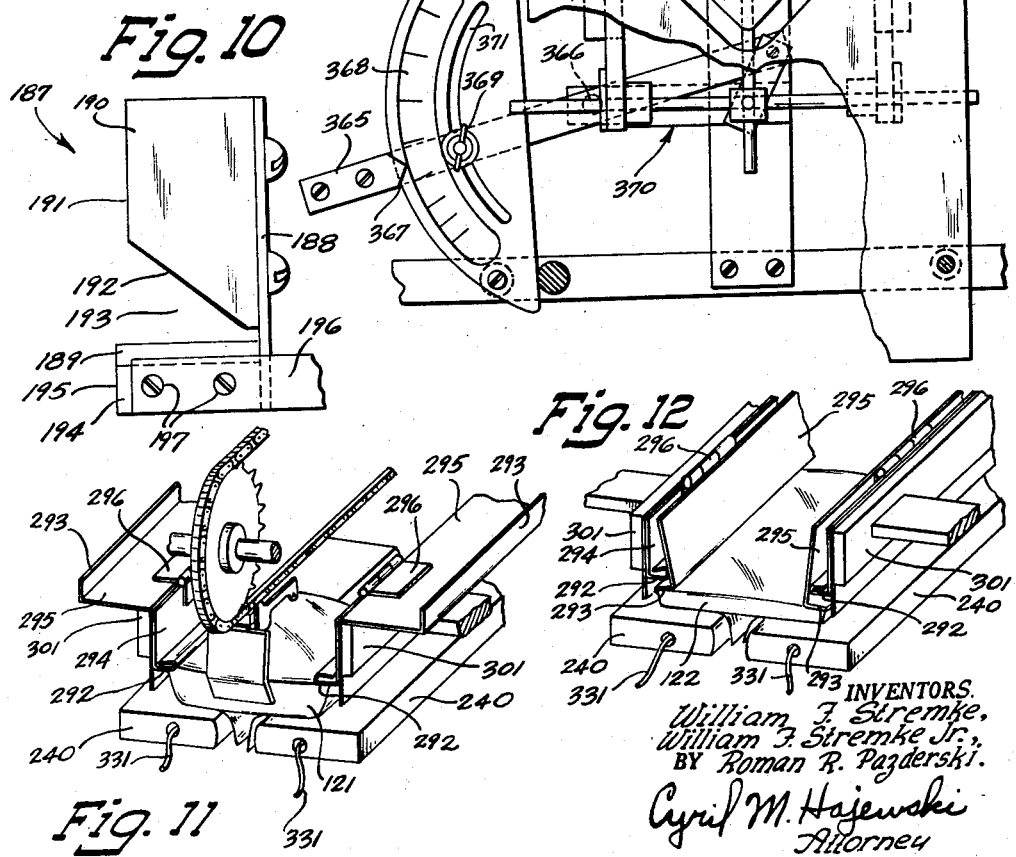
INVENTORS.
William F. Stremke,
William F. Stremke Jr.,
BY Roman R. Pazderski.
Cyril M. Hajewski
Attorney

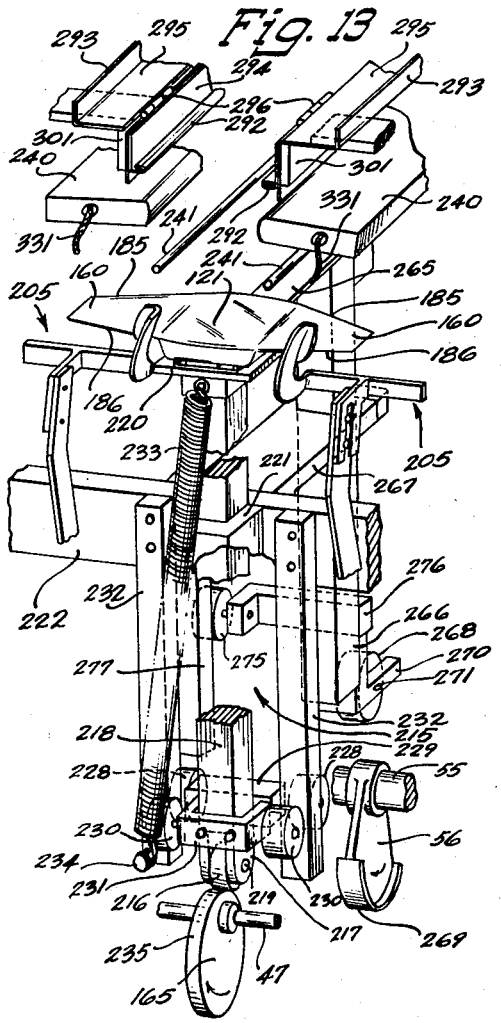
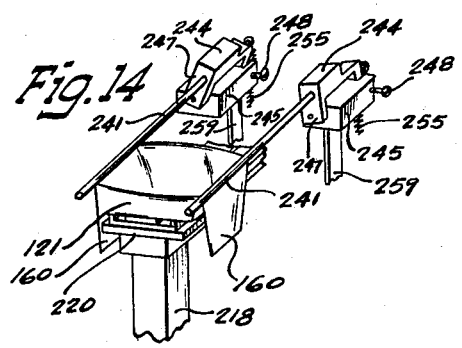
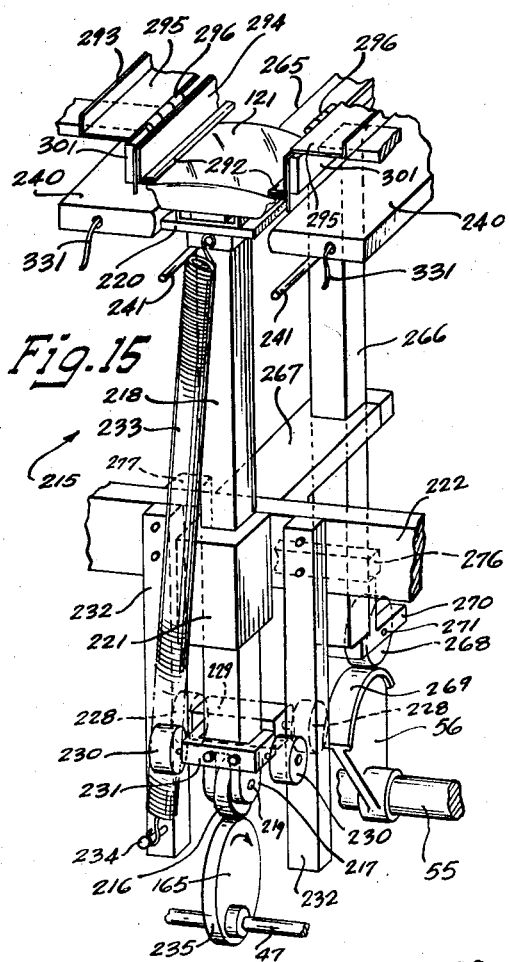

United States Patent Office 2,917,886
Patented Dec. 22, 1959

2,917,886

SEMI-AUTOMATIC WRAPPING MACHINES

William F. Stremke, Greenfield, and William F. Stremke, Jr., and Roman R. Pazderski, Milwaukee, Wis.

Continuation of application Serial No. 623,027, November 19, 1956. This application April 7, 1958, Serial No. 726,992

21 Claims. (Cl. 53—206)

The present application is a continuation of our pending patent application entitled Semi-Automatic Wrapping Machine, Serial Number 623,027, filed November 19, 1956, now abandoned and is a continuation-in-part of our copending patent application entitled Semi-Automatic Wrapping Machine, Serial Number 452,593 filed August 27, 1954.

This invention relates generally to a wrapping machine and more particularly to an improved machine for wrapping meat, produce, and other bulk foods in sealed, transparent packages containing varying quantities to accommodate the requirements of customers in self-service food markets.

The present invention comprises improvements in the semi-automatic wrapping machine disclosed in our above-mentioned co-pending patent application, Serial Number 452,593 filed on August 27, 1954. It provides a superior machine structure for smoother and more dependable operation that performs its wrapping function more efficiently.

It is a general object of the present invention to provide an improved power operated machine for wrapping merchandise in a sheet of wrapping material.

Another object of the present invention is to provide a prewrap table in combination with a semi-automatic wrapping machine for performing the complete operation of wrapping a tray containing food in a sheet of heat sensitive wrapping material that may be fused by heat to seal the package.

Another object is to provide an improved wrapping machine having antifriction supports for its slidable members to achieve a smoother and more dependable operation.

Another object is to provide a food wrapping machine having draw arms for drawing the wrapping material downwardly and creasing it along the edge of the food container being wrapped to prepare the wrapping material for a folding operation, the creasers being especially adapted to function regardless of whether the food being wrapped is contained in a tray or on a board of comparable size without disturbing the setting of other parts of the machine.

A further object of the invention is to provide a wrapping machine with a movable support arm for supporting the underside of the package while the folders are operating to fold the wrapping material to the underside of the package.

A further object of the present invention is to provide a food wrapping machine with selectively operable abutments for limiting the upward movement of the package while the folders are operating on it so that the abutments accommodate either the negligible height of a flat board for receiving the food to be wrapped, or the relatively substantial height of a tray for containing the food.

A still further object is to provide an improved wrapping machine with a mechanism for moving the completely wrapped and sealed package from the hot plate utilized for effecting the final seal onto a cooling grid to avoid excessive exposure to the heat from the hot plate, and thereby prevent overheating of the package.

According to this invention the improved semi-automatic wrapping machine includes a prewrap table for facilitating the performance of the manual operation of placing a sheet of heat sensitive wrapping material about the merchandise to be wrapped such as meat or similar food contained in a tray or on a flat board. The wrapping material is preferably placed about the merchandise with two diagonally opposite corners brought together at the underside of the tray or board for completing a diamond wrap. A hot plate is conveniently mounted on the prewrap table for applying heat to the two corners of the wrapping material at the underside of the tray to fuse them together and thereby secure the wrapping material about the merchandise. With the sheet of wrapping material thus placed about the merchandise, two of its corners will extend laterally from the tray or board at opposite sides, and it is the function of the machine to neatly fold these extending corners downwardly and to the underside of the tray or board and seal them in this position by the application of heat. In order to effect this folding operation, the merchandise, with the wrapping material placed about it as described, is set on a conveyor which moves the package with the two corners of the wrapping material extending laterally from the tray, into a folding mechanism where the folding operation is performed on these extending corners. As the conveyor moves the merchandise with the wrapping material about it into the folding mechanism, it moves the advanced longitudinal sides of the extending corners against a pair of front tuckers to tuck the front sides of the extending corners against a pair of front tuckers to tuck the front sides inwardly toward the center of the tray or board for drawing the wrapping material tightly about the adjacent corners of the tray or board.

After the front tuckers have performed their function, a pair of rear tuckers are actuated to similarly tuck the rear sides of the extending corners to draw them tightly about the adjacent corners of the tray or board to form a neat package. While the rear sides are being tucked inwardly toward the center of the package, an elevator functions to raise the package into position for operation upon by a pair of folders, each of which functions to fold one of the extending corners with its sides tucked inwardly to the underside of the package. As the package of merchandise is being moved upwardly by the elevator it passes between a pair of draw arms which serve to draw the extending corners of the wrapping material downwardly and draw the wrapping material tightly about the edges of the tray or board to thereby prepare the extending corners of the wrapping material for operation upon by the folders. The draw arms are mounted on pivotable brackets adapted to change the spacing of the draw arms selectively for operating on either trays or boards of corresponding size.

The folders are heated by suitable heating elements for the purpose of applying heat to the wrapping material to fuse the several folds and bind them together at the underside of the tray. The two folders move in unison in an arcuate path, in opposite direction toward each other so that each contacts one of the downwardly extending corners of the wrapping material and moves it to the underside of the tray, applying heat to it at the same time to bind it to the wrapping material at the underside of the tray and thereby securely seal the package. As the folders contact the bottom of the tray or board which contains the merchandise, the elevator moves downwardly out of engagement with the package in order to avoid interfering with the functioning of the folders. However, a narrow support arm acting in conjunction with the elevator, remains in the raised position while the elevator is moving downwardly, ad supports the central portion of the tray or board while the folders are operating to prevent the tray or board from buckling.

In order to apply a slight pressure to the underside of the package while effecting the seal, the folders force the upper edges of the tray or board against a pair of abutments which limit the upward movement of the package. Since the trays are provided with sides, their height is considerably greater than the flat boards. Two pairs of abutments are therefore provided for selective operation to accommodate both the trays and the boards, the abutments for the flat boards being mounted on a hinged flap which may be simply pivoted to move their associated abutments into and out of operating position.

After the folders have completed their function, a transfer mechanism operates to slide the package off of the folders and over a notched plate. The now downwardly extending extremities of the wrapping material enter the notch in the plate, and as the package passes over the plate, the latter folds the extending extremities to the underside of the package. The transfer mechanism continues to slide the package from the notched plate onto a hot plate where the transfer mechanism releases the package. The package rests for a moment on the hot plate to heat the wrapping material at the underside of the package to fuse it together and thereby seal the package. A second transfer mechanism functions in timed relationship with the first transfer mechanism to engage the package after it has rested on the hot plate a sufficient length of time to fuse the wrapping material without excessively heating the merchandise, and moves the package onto a cooling grid which accelerates the cooling of its underside, the package being then ready to be removed from the machine and placed on display.

The foregoing and other objects of the invention, which will become apparent from the following detailed specification setting forth an illustrative embodiment, may be achieved by the particular apparatus depicted in and described in connection with the accompanying drawings, in which:

Figure 4 is a fragmentary view substantially in left side elevation illustrating the mechanism for adjusting the spacing of parts of the machine to accommodate the varying widths of the packages to be wrapped;

Figure 5 is a fragmentary view substantially in vertical section taken along the plane represented by the line 5—5 in Figure 4, illustrating one of the three nut and screw mechanisms for adjusting the spacing of parts of the machine to accommodate the varying widths of packages;

Figure 6 is an enlarged detail view in vertical section taken along the plane represented by the line 6—6 in Figure 4 to show the mounting of the conveyor guide rails;

Figure 7 is an enlarged detail view in side elevation showing the linkage for actuating the rear tuckers;

Figure 8 is a detail plan view of the slide mechanism and its associated parts for limiting the upward movement of the package while the folders are folding the wrapping material underneath it;

Figure 9 is a fragmentary plan view showing the mechanism for adjusting the longitudinal position of the front tuckers to accommodate the varying lengths of packages; with the hot plate being broken away to reveal the parts underneath it;

Figure 10 is an enlarged detail view in side elevation depicting one of the front tuckers;

Figure 11 is a fragmentary enlarged perspective view illustrating the position of the folders after they have folded the extending ends of the wrapping material to the underside of a tray containing mechandise with the flat board abutments being pivoted to their inoperative position and the folders forcing the top of the tray against the tray abutments;

Figure 12 is a fragmentary view generally similar to the view in Figure 11 except that a flat board supporting merchandise has been substituted for the tray, and the flat board abutments are in their operative position, rendering the tray abutments inoperative so that the folders are forcing the top of the edges of the flat board against the flat board abutments;

Figure 13 is a fragmentary enlarged perspective view illustrating the package being supported by the elevator mechanism in its lower position while the front tuckers are operating on the extending corners of the wrapping material and the support arm cam is in its lower position out of engagement with the support arm roller;

Figure 14 is a fragmentary perspective view showing the elevator mechanism raising the package past the draw arms to draw the extending corners of the wrapping material downwardly to prepare them for operation upon by the folders;

Figure 15 is a view generally similar to the view of Figure 13 except that the elevator is shown in its uppermost position with the package located for operation upon by the folders and the support arm cam rotated to engage its cooperating roller for holding the support arm in its upper position to support the center of the package while the elevator is moving downwardly and the folders are operating at the underside of the package;

Figure 16 is a detail view in side elevation of the pivotable bracket shown in Figure 15.

Figure 17 is an elevation taken along the line 17—17 of Figure 16.

Figure 1:
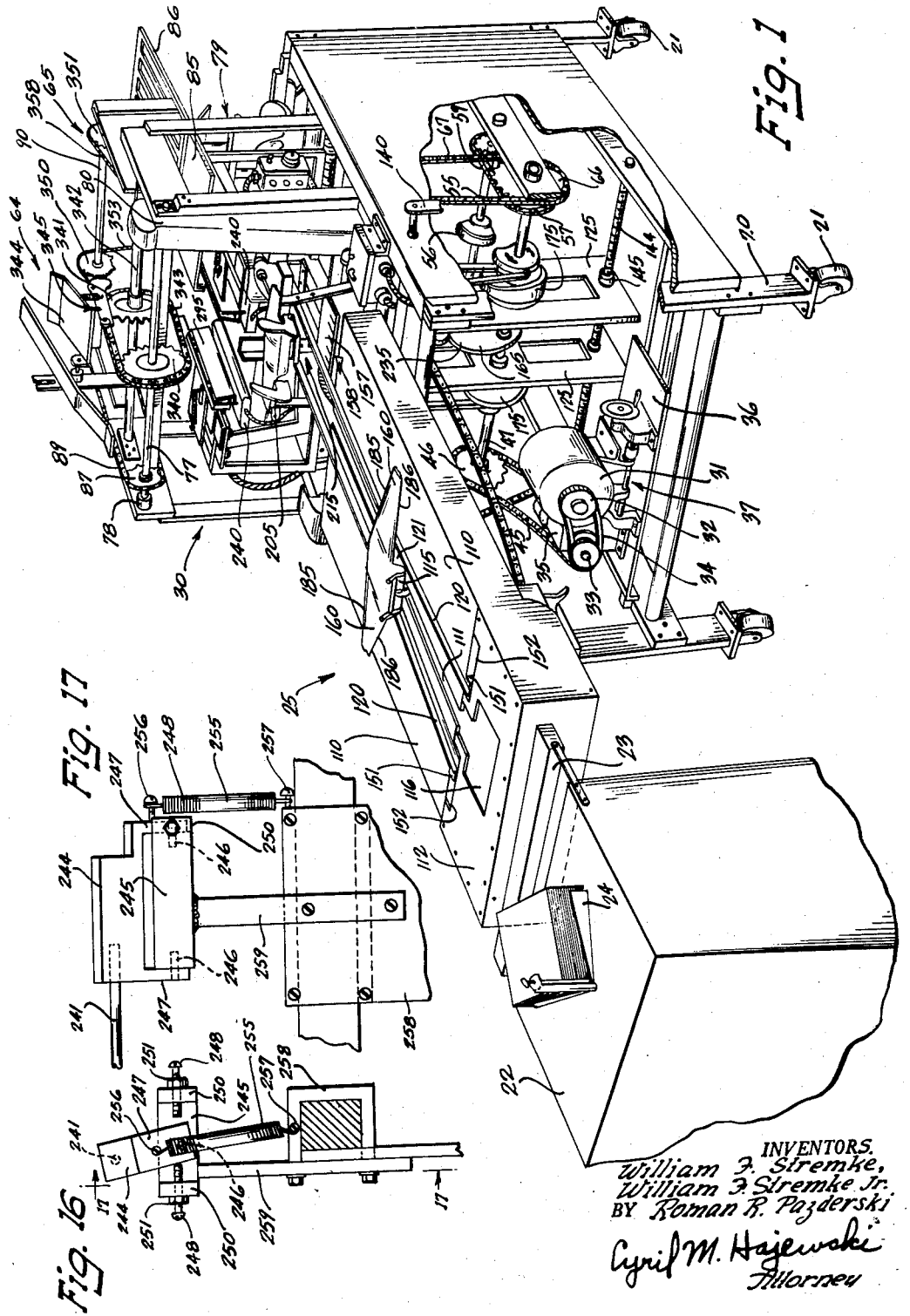
Figure 1 is a perspective view of a semi-automatic wrapping machine embodying the features of the present invention, with a panel broken away to reveal the actuating mechanism.

Reference is now made more particularly to the drawings, and specifically to Figure 1 thereof showing a perspective view of a wrapping machine embodying the features of the present invention. The machine is carried by a frame 20, supported by four casters 21 to render it readily movable. Although the wrapping machine of the present invention is not confined to a particular wrapping operation, it is especially intended for use in self-service food markets to wrap bulk food in a transparent wrapping material. It is particularly well adapted to perform what is known in the trade as a diamond wrap, in which the wrapping material is cut into square sheets and is wrapped around the merchandise so that diagonally opposite corners of the sheet are brought together, preferably at the underside of the package. Furthermore, since packages of this nature must be sealed, the machine is intended to be used with a heat sensitive wrapping material which will fuse upon the application of heat to efficiently seal the package. In view of the fact that the wrapping material is preferably transparent as well, it has been found that cellophane is an ideal wrapping material by virtue of its transparency and the fact that it may be effectively sealed by the application of heat.

The wrapping machine of the present invention is not completely automatic since the initial operation of the wrapping procedure is performed manually. This manual operation comprises placing the sheet of wrapping material about the article to be wrapped with a pair of diagonally opposite corners brought together at the underside of the article. This initial operation is performed on a table 22 which is similar in construction to the wrapping table described in our co-pending patent application, Serial Number 433,664, filed June 1, 1954, now U.S. Patent No. 2,840,962.

The table 22 includes a hot plate 23 which serves as a source of heat that is applied to the two corners of the wrapping material at the underside of the article to bind the two corners together. The sheets of wrapping material that are to be placed about the article are contained in a receptacle 24 which is conveniently located on the top of the table 22 and from which the individual sheets of wrapping material can be readily withdrawn by the operator. After the wrapping material has been thus placed and secured about the article to be wrapped with two diagonally opposite corners bound together at the underside of the article, the article is placed upon a conveyor which is generally identified by the reference numeral 25, the table 22 being located at the end of the conveyor 25. The conveyor 25 functions to move the article, with its sheet of wrapping material about it, into a folding mechanism generally identified by the reference numeral 30 where the more complex and time consuming portion of the wrapping procedure is completed automatically in a manner to be subsequently described.

The several operating mechanisms of the machine are driven by a single electric motor 31 having a pulley 32 keyed to its drive shaft and connected to drive a pulley 33 by a belt 34. The pulley 33 is keyed to the input shaft of a gear reducer 35 which is carried with the motor 31 on a mounting plate 36, the latter being secured to the frame 20 as shown in Figure 1. The pulley 33 is of the well known expandable type in which its side members are yieldably urged toward each other to render its pitch diameter variable for the purpose of infinitely varying the speed at which it is driven. The pitch diameter of the pulley 33 is adjusted by adjusting the spacing between the pulley 32 and the pulley 33. To this end, the motor 31 is supported on the plate 36 by a motor mount 37 having a screw and nut connection (not shown) to move the motor in either direction relative to the gear reducer 35 to thereby adjust the spacing between the pulleys 32 and 33 and consequently, the pitch diameter of the pulley 33 for effecting a change in the rate of rotation of the pulley 33.

Figure 2:
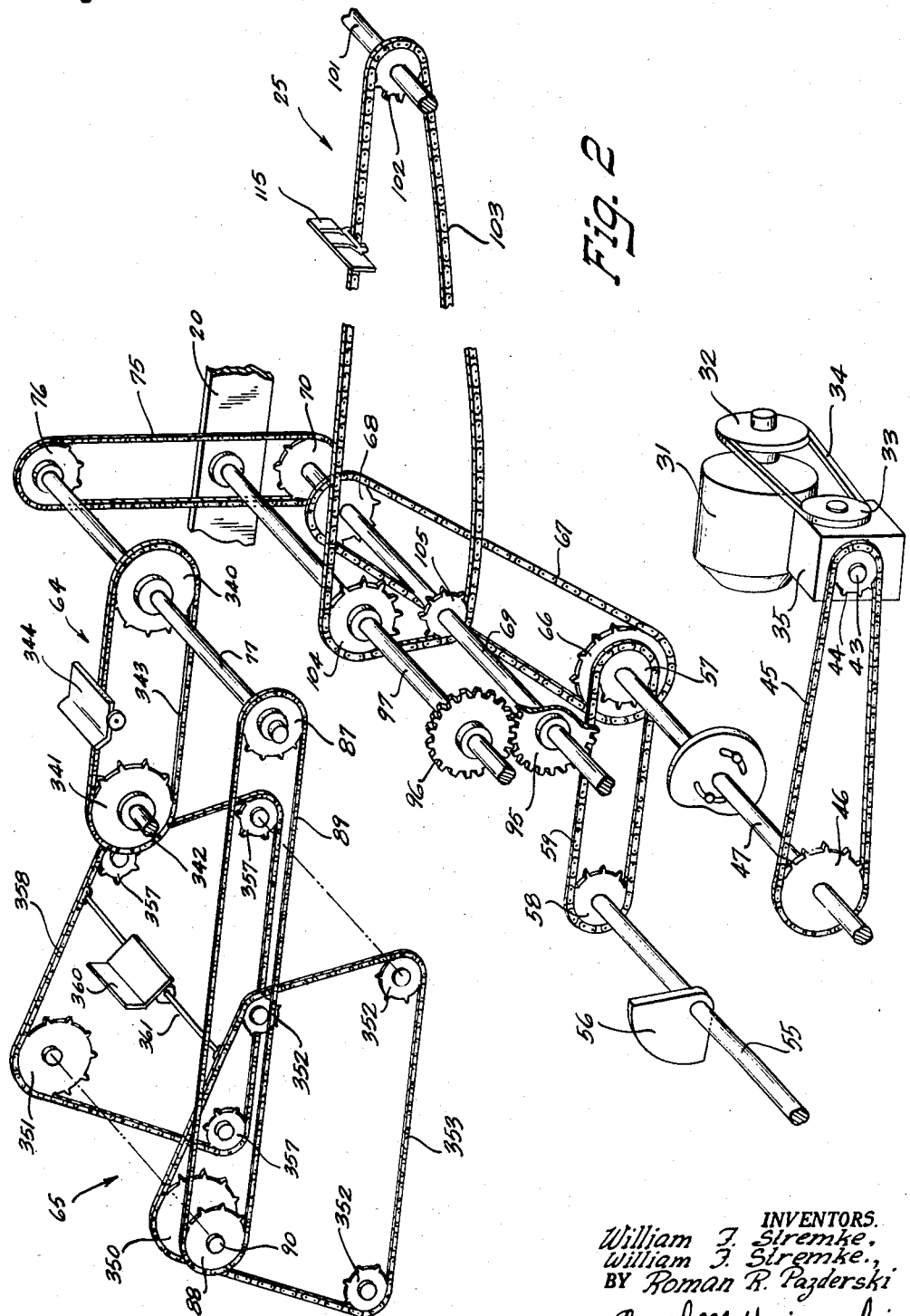
Figure 2 is a perspective view of the power train for transmitting power to the operating mechanisms of the machine illustrated in Figure 1.
Figure 3:
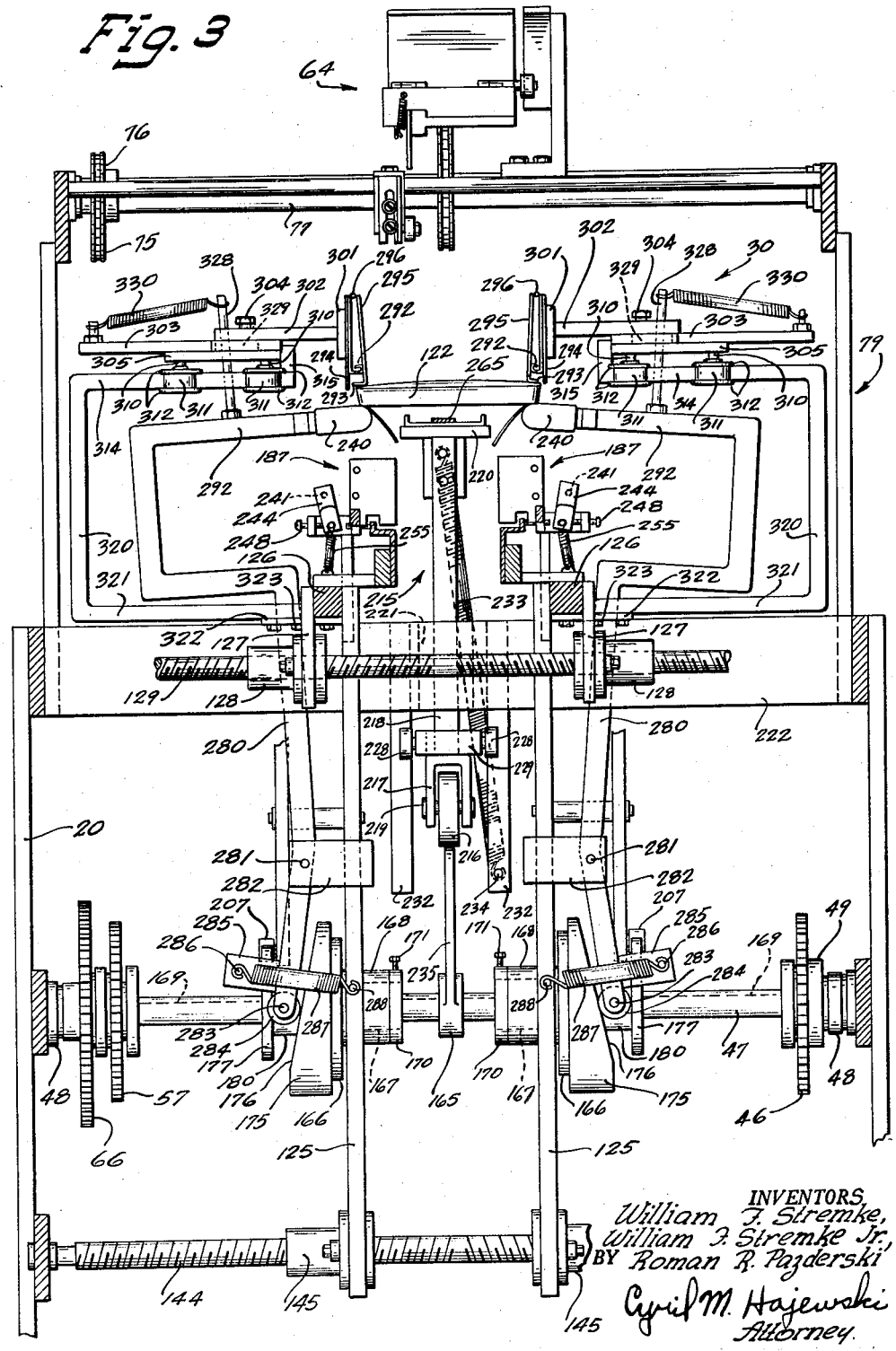
Figure 3 is an enlarged fragmentary view substantially in rear elevation, depicting the folding mechanism and the cam shaft which actuates the several parts of the folding mechanism for folding the wrapping material to the underside of the package.

As best shown in Figure 2, the gear reducer 35 is provided with an output shaft 43 disposed 90° to its input shaft, and having keyed to it a drive sprocket 44. The drive sprocket 44 is connected by a chain 45 to drive a sprocket 46 mounted on a cam shaft 47 which is journalled in bearings 48 fixed in the frame 20 as shown in Figure 3. All of the power utilized for driving the various mechanisms of the machine is transmitted from the electric motor 31 to the cam shaft 47 through the sprocket 46. The latter is therefore connected to drive the cam shaft 47 through a slip clutch 49 which provides a yieldable driving connection between the sprocket 46 and the cam shaft 47 so that if an overload occurs in any part of the machine, the sprocket 46 will slip relative to the cam shaft 47 to terminate the transmission or power to all of the operating mechanisms for the purpose of preventing possible damage.

As shown in Figures 1 and 2, rotation of the cam shaft 47 serves to revolve a secondary cam shaft 55 which is journalled in the frame 20 and has a support arm cam 56 keyed to it to rotate with it for the purpose of holding a support arm in operating position as will later be described. The power is transmitted from the cam shaft 47 to the secondary cam shaft 55 by means of a sprocket 57 keyed to the cam shaft 47 and operatively connected to a sprocket 58 by means of a chain 59. The sprocket 58 is keyed to the secondary cam shaft 55 to complete the connection between the cam shaft 47 and the cam shaft 55 for revolving the support arm cam 56 in timed relationship with the several cams keyed to the cam shaft 47.

In addition to actuating the folding mechanism 25 in a manner to be subsequently described, the cam shaft 47 also serves to drive a primary transfer mechanism generally identified by the reference numeral 64 and a secondary transfer mechanism generally identified by the reference numeral 65 as well as the conveyor 25. As best shown in Figure 2, the power for driving the two transfer mechanisms and the conveyor is transmitted from the cam shaft 47 through a sprocket 66 keyed thereto and in engagement with a chain 67 having similar engagement with a sprocket 68 keyed to a shaft 69 which is rotatably supported by the frame 20. The chain 67 therefore, serves to transmit the power from the cam shaft 47 to the shaft 69 to rotate a sprocket 70 keyed to the shaft 69 at its end adjacent to the location of the sprocket 68.

The sprocket 70 serves to transmit the power for driving both the primary transfer mechanism 64 and the secondary transfer mechanism 65. To this end, the sprocket 70 has meshing engagement with a drive chain 75 which also engages a sprocket 76 keyed to a shaft 77, the latter being journalled in bearings 78 supported by an upper extension 79 of the frame 20 as shown in Figures 1 and 3. As shown in Figure 1, the chain 75 and sprocket 76 are disposed within a guard 80 to prevent injury to the operator. Thus, the power is transmitted from the shaft 69 through the sprocket 70, the chain 75, and the sprocket 76 to rotate the shaft 77 for operating the transfer mechanism 64. The latter functions to transfer the package from the folding mechanism 30 to a hot plate 85 after the folding mechanism has completed its operation upon the package.

After the package has rested upon the hot plate 85 for a predetermined period of time to effect the sealing of the wrapping material about the article, it is essential that the package be moved off of the hot plate 85 onto a cooling grid 86 (Figure 1) to avoid excessive heating of the contents of the package. To this end, the secondary transfer mechanism 65 is provided and is connected to be driven by the shaft 77 for the purpose of operating in timed relationship with the operation of the transfer mechanism 64 so that after the transfer mechanism 64 has deposited the package upon the hot plate 85, the secondary transfer mechanism 65 proceeds to transfer the package from the hot plate 85 to the cooling grid 86. The cooling grid 86 serves to accelerate the cooling of the bottom of the package and the completed package may be removed from it to be placed on display or in storage.

The power for driving the secondary transfer mechanism 65 is taken from the shaft 77 by a sprocket 87 that is in driving engagement with a cooperating sprocket 88 by means of a chain 89. The sprocket 88 is keyed to a shaft 90 that is journalled in the upper extension 79 at substantially the same level as the shaft 77. This connection therefore, rotates the shaft 90 to drive the secondary transfer mechanism 65 which operates in a manner to be subsequently described.

The conveyor 25 is likewise driven from the shaft 69 through a spur gear 95 keyed to it. The spur gear 95 has meshing engagement with a cooperating spur gear 96 keyed to a shaft 97 that is rotatably supported by the frame 20 and connected to actuate the conveyor 25 as clearly shown in Figure 2. Thus, it is apparent, that the power from the motor 31 is transmitted to the sprocket 46 and branches therefrom to actuate the four operating mechanisms of the machine, comprising the conveyor 25, the folding mechanism 30, the primary transfer mechanism 64, and the secondary transfer mechanism 65.

The conveyor 25 comprises a conveyor frame (not shown) supported by the frame 20 to extend forwardly thereof as illustrated in Figure 1. At its forward end the conveyor frame (not shown) supports a shaft 101 shown in Figure 2, and upon which is rotatably mounted an idler sprocket 102 centrally disposed for receiving an endless conveyor chain 103, to form one end of the loop about which the chain 103 travels. The other end of the loop is defined by a drive sprocket 104 and an idler sprocket 105. As previously mentioned, the power for driving the conveyor 30 is taken from the shaft 97, and the guide sprocket 104 is therefore keyed to the shaft while the idler sprocket 105 is rotatably mounted on the shaft 69 to rotate relative to it, being located beneath the drive sprocket 104 to increase the width of the loop through which the chain 103 travels. The shaft 101 is mounted on the conveyor frame for lateral adjustment to provide for adjusting the tension in the chain 103 in well known manner.

Two plates 110 are mounted on top of the conveyor frame with one being disposed on either side of the chain 103 to form a table top along a substantial length of the conveyor as depicted in Figure 1. The plates 110 are spaced from each other to form a longitudinal gap 111 centrally disposed to coincide with the path of travel of the chain 103, the gap 111 being slightly wider than the width of the chain 103. The top surface of the chain 103 along the upper portion of its loop is located just beneath the plates 110 so that it does not protrude above them when in operation. The plates 110 extend forwardly to the end of the loop formed by the chain 103, and a frontward extension to the table top created by the plates 110 is formed by a plate 112, conforming in width to the table top formed by the plates 110.

Attached to the chain 103 in equally spaced relationship and extending outwardly therefrom are three pusher members 115, only one of which is illustrated in Figure 2. The pusher members 115 travel with the chain 103 and emerge from beneath the plates 110 as they travel along the lower length of the loop, through an opening 116 formed in the plate 112 to extend above the plates 110 as they move along the upward length of the loop formed by the chain 103.

A pair of conveyor guide rails 120 set upon the plates 110 and extend rearwardly beyond the end of the plates 110 into the folding mechanism 30. The conveyor guide rails 120 are formed of structural angles as shown in Figure 5, and one guide rail 120 is located on each side of the gap 111, equally spaced from the gap, with its horizontal leg extending inwardly toward the gap. After the sheet of wrapping material has been manually placed about the article to be wrapped and secured thereto as previously described, the article is placed upon the conveyor 30 between the two guide rails 120. At the forward end of the conveyor, adjacent to the plate 112, the guide rails 120 are spaced a distance substantially greater than the width of the article to be wrapped for the convenience of the operator to avoid the necessity of carefully fitting the article between the two guide rails. From the plate 112, the guide rails 120 taper inwardly until their vertical legs are spaced a distance conforming with the width of the article being wrapped.

Therefore, when the article is placed upon the conveyor 30 it will be resting upon the plates 110 over the gap 111. As one of the pushers 115 moving with the chain 103 engages the article, it pushes it along the plate 110 between the guide rails 120. When the article reaches the portion where the spacing of the guide rails 120 conforms to the width of the article, the latter is pushed onto the horizontal legs of the guide rails 120 which serve to support it while the vertical legs guide it. The pushers 115 then push the article along the guide rails 120 beyond the end of the plates 110 into the folding mechanism 30. Since the articles which are to be wrapped will vary in width, the guide rails 120 are movably mounted for lateral adjustment for the purpose of varying the spacing to accommodate articles of different widths.

In Figure 1, the article being wrapped is illustrated as a standard paper tray 121 having upwardly extending sides for receiving meat or other bulk foods. The illustrated machine is especially adapted to wrap the trays 121 with food contained therein or flat boards 122 with food placed upon them. The flat boards 122 are usually preferred for supporting food that is sold in thin slices in the manner that sausage or cheese are frequently sold, such flat board 122 being illustrated in Figure 12. The trays 121 and boards 122 are furnished in several standard sizes, with each size being identified by a number. The bottom of each size of tray is of the same dimensions as a flat board of the same size number. The tray, of course, includes upwardly and outwardly extending sides which add to the height and width of the tray and are not a part of the flat board 122. For this reason, the over-all dimensions of a tray 121 are slightly greater than the corresponding dimensions of a flat board 122 having the same size number. The machine shown is especially adapted to be adjusted for these standard trays 121 and boards 122 as will be seen, although it is to be understood that other articles may also be wrapped by the machine, it not being essential to employ a particular type of tray for use with the machine.

The folding mechanism 30 must likewise be adjusted to accommodate different widths of trays 121 as will be seen, and to this end there are provided two vertical mounting brackets 125 as clearly shown in Figures 3 and 4. The mounting brackets 125 are oppositely disposed on either side of the center of the machine with each bracket 125 being equally spaced from the center of the machine. At their upper extremities, each of the brackets 125 is provided with an elongated horizontal crossbar 126 extending on either side of the bracket 125. At its rearwardly extending portion, each of the crossbars 126 supports a depending bracket 217 to which is rigidly secured a nut 128 as best seen in Figures 3 and 4.

The two nuts 128 are oppositely threaded and are disposed in alignment for operatively receiving a screw 129 rotatably supported by the frame 20 and provided with a sprocket 130 keyed to it at one extremity, adjacent to the frame 20. One half of the screw 129 is provided with a right hand thread for engagement with the right hand thread of the mating nut 128, and the other half of the screw 129 is provided with a left hand thread for engagement with the left hand thread of the other of the two nuts 128. With this arrangement, rotation of the screw 129 will cause the nuts 128 to move in opposite directions so that both will move uniformly either outwardly to increase their spacing or inwardly toward each other to decrease their spacing.

In like manner, the forwardly extending portion of each of the crossbars 126 supports a depending bracket 135 as shown in Figures 4 and 5. A nut 136 is fixed to each of the brackets 135, one of the nuts 136 being threaded oppositely to the other. The nuts 136 are disposed in alignment to operatively receive a screw 137 which is rotatably mounted in the frame 20 and is provided with a sprocket 138 keyed to it at its extremity adjacent to the frame 20 so that the sprocket 138 will serve to rotate the screw 137. One half of the screw 137 is provided with a right hand thread for engagement with the right hand thread of the mating nut 136, and the other half of the screw 137 is provided with a left hand thread for engagement with the left hand thread of the other of the two nuts 136 as clearly shown in Figure 5. Therefore, the nuts 136 are arranged in the same manner as the nuts 128 so that rotation of the screw 137 will cause the nuts 136 to move uniformly in opposite directions either toward or away from each other. A squared end 139 of the screw 137 extends outwardly of the frame 20 for receiving a crank 140 which may be conveniently manipulated to manually revolve the screw 137.

The brackets 125 are supported in like manner at a third point by a screw 144 that is rotatably carried by the frame 20 and has a left hand thread formed along half of its length and a right hand thread along the other half in the same manner as the screws 129 and 137. As clearly illustrated in Figures 3 and 4, the screw 144 is in meshing engagement with a pair of nuts 145, one of which is fixed to each of the brackets 125, centrally located at their lower extremities. One of the nuts 145 is provided with a left hand thread for engagement with the left hand thread of the screw 144 while the other nut 145 has a right hand thread for engagement with the right hand threaded portion of the screw 144. The screw 144 also has a sprocket 146 keyed to it at one end in the same plane as the sprockets 130 and 138 of the screws 129 and 137 respectively.

The three screws 129, 137 and 144 are mounted in the frame 20 so that the left hand threads are on one side of the machine for engagement with the left hand threaded nuts 128, 136 and 145 respectively which are all fixed so that they cannot rotate but move axially with one of the brackets 125. Obviously therefore, the right hand threads of the screws 129, 137 and 144 are disposed on the opposite sides of the machine for engagement with the right hand threaded nuts 128, 136 and 145 respectively, which are also fixed so that they cannot rotate but are secured for axial movement with the other of the two brackets 125.

With this arrangement, the brackets 125 are firmly supported at three points, spaced to form a triangle, by the screws 129, 137 and 144. It is only necessary to revolve these three screws simultaneously, in either direction, for effecting a simultaneous uniform movement of the two brackets 125 either toward each other to reduce their spacing, or away from each other to increase their spacing. To this end, the three sprockets 130, 138 and 146 which are keyed to the screws 129, 137 and 144 respectively, and are disposed in the same plane, are in meshing engagement with an endless chain 147 for effecting simultaneous rotation of the sprockets and their cooperating screws at a uniform rate.

The chain 147 is also in meshing engagement with an idler sprocket 148 that is rotatably supported by a plate 149 which is mounted on the frame 20 for vertical adjustment to vary the vertical position of the sprocket 148 for the purpose of adjusting the tension in the chain 147 as clearly shown in Figure 4. Therefore, to vary the spacing of the brackets 125 and the parts supported by them, it is only necessary to manipulate the crank 140 to revolve the screw 137 and its associated sprocket 138 to actuate the chain 147 and thereby revolve the three screws 129, 137 and 144 simultaneously at a uniform rate in either direction by reason of the engagement of the chain 147 with its cooperating sprockets 130, 138 and 146.

The conveyor guide rails 120 must be adjusted laterally for the purpose of varying their spacing to accommodate the varying widths of articles which are to be wrapped as previously mentioned. Therefore, each of the two guide rails 120 is attached to one of the cross bars 126 which move with the brackets 125 by reason of their connection therewith as previously described. As best seen in Figures 4 and 6, each of the guide rails 120 is secured to its associated cross bar 126 by an L shaped bracket 150 having its horizontal leg secured to the cross bar 126 and its vertical leg fixed to the guide rail 120 to secure the guide rail 120 to the cross bar 126.

Additional support for the guide rails 120 at the forward end of the machine is provided by the cross bars 126 which extend from the rear of the machine forwardly underneath the plates 110 of the conveyor 25 to the ends of the plates. An upstanding lug 151, shown in Figure 1, is secured to each of the cross bars 126 at its forward end and extends upwardly therefrom through a slot 152 formed in the plate 112 to be attached to the guide rail 120 at its forward end. Thus, the conveyor guide rails 120 are supported at both ends by the cross bars 126 through the L shaped brackets 150 at their rear portions and the upstanding lugs 151 at their forward ends so that their spacing may be varied by adjusting the spacing of the brackets 125.

As is illustrated in Figure 1, a graduated scale 157 is provided for the purpose of establishing the proper spacing of the brackets 125 to accommodate the standard size trays 121 and flat boards 122. The graduated scale 157 is secured to one of the guide rails 120 in position to cooperate with a pointer 158 that is mounted on the plate 110 so that it is fixed relative to the movable graduated scale 157. The scale 157 is graduated to indicate the proper spacing of the brackets 125 for the standard size trays 121 and flat boards 122. It is therefore only necessary to revolve the crank 140 and observe the position of the pointer 158 relative to the scale 157 to establish the desired spacing of the brackets 125 and the parts supported by them.

As previously mentioned, the tray 121 or flat board 122 with the sheet of wrapping material wrapped about it is placed upon the conveyor 25 and two ends 160 of the wrapping material extend laterally from the sides of the tray or board. The folding mechanism 30 operates to move these two ends 160 downwardly and fold them underneath the tray 121 or board 122 and seal them in position to complete the wrapping operation. In order to produce a neat package with no protruding corners, it is necessary to tuck both longitudinal sides of each of the ends 160 inwardly toward the center of the tray 121 or board 122 to draw the wrapping material tightly about the corners of the tray. After the sides of the ends 160 are thus tucked inwardly, the ends 160 are folded under the tray 121 or board 122 and sealed in that position by the application of heat in a manner to be subsequently described.

The several operating parts of the folding mechanism 30 are actuated by the set of cams mounted on the cam shaft 47 to rotate with it as best seen in Figure 3. A single elevator cam 165 is secured to the shaft 47 to rotate with it and is permanently fixed against axial movement at the center of the shaft 47 midway between the two brackets 125. The remaining cams on the cam shaft 47 are mounted on a pair of flanges 166 each of which is attached to the end of a sleeve 167. Since the arrangement of cams on either side of the cam 165 on the cam shaft 47 is identical and symmetrical, and the parts operated by similar cams are likewise identical in construction and operation, it will be only necessary to refer to one side of the folding mechanism in the description, but like parts are identified by like reference numerals, and it is to be understood that both sides operate in an identical manner.

The sleeve 167 is journalled in a bearing 168 that is mounted on the bracket 125, and is keyed to the shaft 47 in an elongated key slot 169 extending through the entire length of the cam shaft 47. The end of the sleeve 167 opposite the flange 166 extends beyond the bearing 168 to receive a collar 170 secured thereto by a set screw 171 to retain the sleeve 167 within the bearing 168.

A drum shaped folder cam 175 is secured to the face of the flange 166 with its outwardly extending edge presenting a cam surface 176 for operating a folder in a manner to be described. As best seen in Figures 3 and 4, a rear tucker cam 177 is secured to the folder cam 175 to rotate with it by a pair of screws 178 which extend through elongated arcuate slots 179 formed in the rear tucker cam 177, into engagement with threaded holes (not shown) formed in the folder cam 175. The arcuate slots 179 are elongated to permit rotational adjustment of the tucker cam 177 relative to the folder cam 175 for the purpose of obtaining proper timing of the mechanism.

Proper spacing of the rear tucker cam 177 from the folder cam 175 is achieved by a spacer 180 disposed on the shaft 47 between the two cams as depicted in Figure 3. It will be noted that the cams 175 and 177 are supported by the bracket 125 to move with it, so that the spacing of the two sets of cams will vary with the movement of the brackets 125 while retaining engagement with the shaft 47 to rotate with it by reason of the elongated key slot 169.

As indicated in Figure 1 each of the extending ends 160 of the wrapping material includes a forward side 185 which is in advance of its rear side 186 as the package is moving on the conveyor toward the folding mechanism 30. The conveyor 25 moves the forward side 185 against a pair of front tuckers 187 before the pusher 115 releases the package as it moves downwardly with the chain 103 along the sprocket 104. The front tuckers 187 are shown assembled to the machine in Figures 3 and 9 and one of them is shown in detail in Figure 10. These front tuckers 187 serve to tuck the forward sides 185 of the extending ends 160 inwardly toward the center of the tray to draw the wrapping material tightly about the two adjacent corners. As best seen in Figures 9 and 10, each of the front tuckers 187 comprises an upstanding plate 188 having attached to it at its lower end a bar 189 which extends outwardly of the plate 188. A block 190 is likewise attached to the plate 188 above the bar 189 and presents a vertical front edge 191 and has an inclined lower edge 192 which cooperates with the top edge of the bar 189 to form a V notch 193. An L shaped bar 194 is attached to the bar 189 with one leg extending along the surface of the bar 189 and its other leg extending transversely in front of the bar 189 to present a surface 195 for performing the tucking operation. The entire front tucker unit 187 is mounted on the forward end of a slide bar 196, being secured thereto by suitable screws 197. The slide bars 196 are slidably carried by the machine as will be later described to adjust the longitudinal position of the front tuckers 187 to accommodate packages of different lengths.

In operation, as the package is moved by the conveyor 25, each of the front sides 185 of the extending ends 160 strikes one of the surfaces 195 to be tucked inwardly by it as the package continues its movement. The tucked in sides then slide over the top of the bar 189 and into the V notch 193 which serves to retain the tuck in the side 185 with the plate 188 serving to limit the movement of the package so that it is properly located with respect to the V notch 193.

After the front sides 185 of the extending ends 160 have been thus tucked by the front tuckers 187 due to the positioning of the package by the pusher 115, a pair of rear tuckers 205 shown in Figures 1 and 7 are actuated by the rear tucker cams 177 to similarly tuck the rear sides 186 of the extending ends 160 inwardly toward the center of the package to tighten the wrapping material about their adjacent corners of the tray 121 or flat board 122. A separate linkage 206 is provided for actuating each of the two tuckers 205, the two linkages being identical in construction, one of which is illustrated in Figure 7.

The rear tuckers 205 and their cooperating linkages 206 are supported respectively by the brackets 125 and each linkage includes a roller 207 which is retained in engagement with the cam surface of the cam 177 by a spring 208. The cam 177 includes a relatively long dwell portion and a rise 209. When the rise 209 engages the roller 207 it serves to actuate the linkage 206 to rapidly motivate the rear tucker 205 in an arcuate path about a pivot pin 210 in a counter clockwise direction as viewed in Figure 7 to cause the tucker 205 to tuck the rear side 186 of one of the extending ends 160 inwardly toward the center and underside of the package.

When the conveyor 25 moves the package into the folding mechanism 30 it locates the tray on an elevator mechanism generally identified by the reference numeral 215, and which functions to raise the package to a pair of folders which will be subsequently described. The elevator mechanism 215 begins to raise the package at the same time that the rear tuckers 205 are actuated but after the front sides 185 have been tucked in by the front tuckers 187. As the package rises, the tucked in front sides 185 move out of the V notches 193 and are bent downwardly by the inclined edges 192. They are held in this position during their upward movement by the vertical surfaces 191 along which they slide in their upward movement to retain the tucks until the ends 160 are contacted by the folders which then operate to prevent the release of the tucks as will be later described.

As previously mentioned, the rear tuckers 205 move in their arcuate path toward the rear sides 186 of the extending ends 160 with this movement occurring while the package is being raised by the elevator mechanism 215. As the tuckers 205 are moving their arcuate path they operate to tuck the rear sides 186 inwardly toward the center of the package at the same time that the package is being raised by the elevator mechanism 215. It will be noted that the rear tucker cams 177, the linkages 206 actuated by them, and the tuckers 205 are all carried by the brackets 125 so that the spacing of the two identical mechanisms will vary with the movement of the brackets 125 to accommodate the different size trays 121 and flat boards 122.

As previously mentioned, when the conveyor 25 moves the package into the folding mechanism 30 it locates the package on the elevator mechanism 215 best shown in Figures 3, 13 and 15. The elevator mechanism 215 is actuated by the cam 165 and comprises a roller 216 disposed within a bifurcated end 217 of an elevator bar 218, being rotatably mounted on a pin 219 which extends across the bifurcated end 217. At its upper end the elevator bar 218 presents a plate 220 for receiving the package from the conveyor 25, and is supported for vertical sliding movement by a guide block 221. The latter is provided with a suitable recess for receiving the elevator bar 218 for sliding movement, and is secured to a horizontal crossbar 222 mounted across the frame 20.

In order to prevent binding of the elevator bar 218 within the guide block 221 by lateral forces on the bar, a pair of rollers 228 are provided to guide the elevator bar 218 in its vertical movement. To this end, a block 229 is attached to the lower end of the elevator bar 218 immediately about its bifurcated end 217 and the rollers 228 are rotatably supported by the block 229. A pair of depending arms 232 are fixed to the crossbar 222 the arms 232 being disposed parallel to the elevator bar 218. Each of the rollers 228 is located so that its periphery engages one of the depending arms 232 and roll against these arms as the elevator bar moves in its vertical path of travel.

Similarly, a second pair of rollers 230 are rotatably carried by a U-shaped bracket 231 that is secured to the elevator bar 218. The rollers 230 are disposed so that the periphery of each engages a surface of one of the depending arms 232 to roll along it, the rollers 230 engaging the surfaces of the depending arms 232 that are opposite the surfaces engaged by the rollers 228. It is apparent therefore, that the rollers 228 and 230 serve to prevent excess lateral movement of the lower end of the elevator bar 218 to thereby avoid the possibility of the bar 218 binding in its associated guide block 221 by reason of forces applied to the elevator bar 218 by operation of the cam 165 or through other factors.

The elevator bar 218 and its associated parts are urged downwardly by a coil spring 233 which is attached at one end to the upper portion of the elevator bar 218, and at its other end to a pin 234 which is fixed to the lower extremity of one of the depending arms 232 and extends outwardly therefrom to support the spring 233 a sufficient distance from the arm 232 so that it will not interfere with the movement of the roller 230 along the surface of the arm 232.

The spring 233 therefore functions to urge the elevator bar 218 downwardly to retain the roller 216 in contact with a cam surface 235 formed on the periphery of the elevator cam 165. The cam 165 is arranged to cause the elevator 215 to be depressed by the spring 233 for receiving the package from the conveyor 25. While the tuckers 205 are functioning as described, the cam 165 operates to move the elevator bar 218 upwardly for the purpose of raising the package to the position illustrated in Figure 15 for operation upon by two folders 240, each of which functions to fold one of the two extending ends 160 to the underside of the package and seal it in that position by the application of heat.

As the elevator mechanism 215 is moving the package upwardly and before it arrives at its maximum height, it passes the package between a pair of draw arms 241 in the manner illustrated in Figure 14. The draw arms 241 are accurately spaced so that the space between them conforms very closely to the width of the tray 221 or flat board 222 which is carrying the merchandise that is being wrapped. The draw arms 241 serve to draw the wrapping material tightly over the top of the package and draw the extending ends 160 downwardly while creasing the wrapping material along the edges of the tray 121 or flat board 122 as the wrapping material is drawn taut over the top of the package. This action of the draw bars 241 in drawing the extending ends 160 downwardly places the latter in an ideal position for operation upon the folders 240 as will be presently seen to enable the machine to form a neat and attractive package.

The draw arms 241 are mounted for movement with the brackets 125 so that their spacing will be adjusted with the other mechanism carried by the brackets 125 to accommodate the various sizes of trays 121 or flat boards 122. Such setting of the brackets 125 is established by means of the graduated scale 157 as previously described and the operation of the machine requires that the spacing of the brackets 125 for a particular size tray 121 be identical for the same size number flat board 122 since the bottom of the tray 121 is of the same dimensions as the dimensions of a flat board 122 that is identified by the same size number. However, since the tray 121 includes sides which extend outwardly as well as upwardly, the actual width of a tray 121 is slightly greater than the width of a flat board 122 of the same size number. The draw bars 241 are therefore arranged to accommodate for this difference in overall widths of the same size number flat boards 122 and trays 121 by being movable independently of the brackets 125 as well as with the brackets 125 so that their spacing may be adjusted for a particular setting of the brackets 125.

To this end, each of the draw arms 241 is carried by a bracket 244 which is pivotably supported on a plate 245 by means of a pair of pins 246 as clearly shown in Figures 16 and 17. The bracket 244 includes a pair of depending legs 247 as best seen in Figure 17, and a pin 246 is attached to the lower portion of each of the legs 247 to extend inwardly therefrom toward each other into suitable openings provided in the plate 245. With this arrangement, the bracket 244 is free to pivot relative to the plate 245 about the pins 246 and moves its associated draw arms 241 with it.

The limits of movement of the bracket 244 in either direction is established by a pair of oppositely disposed screws 248 each of which is threaded into one of two parallel rear extensions 250 that extend rearwardly on either side of the plate 245 in parallel relationship to straddle the rear leg 247 of the bracket 244. The screws 248 are in alignment with the rear leg 247 of the bracket 244 so that when the bracket 244 is pivoted in one direction it abuts one of the screws 248, and when it is pivoted in the opposite direction it abuts the other screw 248 so that the screws 248 serve to limit its pivotal movement in either direction. The exact position of the bracket 244 may therefore be accurately controlled by threading the screws 248 in either direction in the rear extensions 250 and they may be locked in the desired position by lock nuts 251.

With this arrangement, for a particular setting of the brackets 125, it is only necessary to pivot the brackets 244 away from each other until they abut their cooperating screws 248 to establish the proper spacing of the draw bars 241 for trays 121 of a size corresponding to the setting of the brackets 125 by means of the graduated scale 157. If flat boards 122 identified by the same size number are being employed, the setting of the brackets 125 remains the same, but the brackets 244 are pivoted inwardly toward each other into abutment with the other of the screws 248 to reduce the spacing of the draw arms 241 to accommodate flat boards 122 of the same size number as the trays 121. It is apparent therefore, that the difference in overall dimensions of the flat boards 122 and trays 121 of the same size number is conveniently accommodated for in the setting of the draw arms 241 without disturbing the setting of the other parts of the machine that are carried by the brackets 125.

The two pivotal settings of the bracket 244 locate the upper portion of the bracket on either side of the centers of the pins 246 so that in either position the bracket is over center. This fact is taken advantage of to retain the bracket 244 in the desired position by providing a coil spring 255 which is attached at its upper end to a screw 256 which is threaded into the rear leg 247 of the bracket 244 in alignment with its adjacent pin 246 but above the pin 246. The lower end of the spring 255 is attached to a screw 257 which is threaded into the slide block 258 beneath the pin 246 and in alignment therewith. Therefore, regardless of the pivotal position of the bracket 244, the action of the spring 255 will prevent the movement of the bracket 244 in its opposite direction, and will yieldably urge it into abutment with either one of its cooperating screws 248 to accurately retain the bracket 244 in the desired position.

It is apparent from the above description that the draw arms 241 are movable independently of the brackets 125 for operation upon either trays 121 or flat boards 122 of the same size number. In addition thereto, the draw arms 241 are movable with the brackets 125 to accommodate trays 121 or flat boards 122 of different size numbers. To this end, the plate 245 is fixed to the upper end of a vertical bar 259 which is attached at its lower end to the slide block 258. The slide block 258 in turn, is secured to the horizontal crossbar 126 by screws 260 as shown in Figure 4. Since the crossbars 126 are attached to the brackets 125 as previously described, the draw bars 241 and their cooperating mechanisms will move toward or away from each other with the brackets 125 to accommodate different size trays or flat boards 122.

After the elevator mechanism 215 moves the package past the draw bars 241 it raises the package to the maximum height for operation upon the folders 240. The folders 240 move toward each other in an arcuate path in a manner to be subsequently described to fold the extending ends 160 of the wrapping material to the underside of the tray 121 or flat board 122. When the package reaches its uppermost limit of movement the folders 240 engage the package at its lower edges as illustrated in Figure 15, and the configuration of the elevator cam 165 is such that when the folders 240 thus engage the edges of the package that is being wrapped, the elevator bar 218 and its associated plate 220 are caused to move downwardly so that the plate 220 is removed from the path of travel of the folders 240 to the underside of the package to avoid interfering with their operation. At this time, the package would only be supported at its edges by the folders 240 and under these circumstances the flat boards 222 carrying a quantity of food, or the extremely wide trays 221 have a tendency to sag at their center. To prevent this, a supplementary support arm 265 is provided, being centrally disposed along the length of the underside of the package to support the package while the folders 240 are operating at its underside.

The supplementary support arm 265 operates in conjunction with the elevator mechanism 215 and overlies the plate 220 of the elevator mechanism 215 as best seen in Figures 3 and 9 so that the latter serves to raise the support arm 265 with it when it raises the package toward the folders 240. The support arm 265 is attached to the upper end of a slide bar 266 which extends downwardly through a recess in a guide block 267 which supports the slide bar 266 for vertical sliding movement. The guide block 267 is secured to the horizontal crossbar 222 on the side opposite the side that supports the guide block 221 which is provided for the elevator bar 218. The lower end of the slide bar 266 is provided with a roller 268 which is located to be engaged by a cam surface 269 formed on the support arm cam 56. The roller 268 is disposed between a pair of laterally extending support members 270 which are fixed to the lower end of the slide bar 266, and the roller 268 is journalled on a pin 271 which is carried by the two support members 270 and extends between them for receiving the roller 268.

In order to prevent binding of the slide bar 266 within the guide block 267 by lateral pressure applied through operation of the cam 56 or other external forces, the slide bar 266 is provided with a guide roller 275, as shown in Figure 13, that is rotatably carried by an L shaped bracket 276 which is fixed to the slide bar 266 immediately above the location of the roller 268. The guide roller 275 is disposed to engage a guide bar 277 that depends from the horizontal crossbar 222 and provides a vertical surface for the roller 275 to roll along. The operation of the roller 275 along the surface of the guide bar 277 serves to prevent excessive lateral movement of the slide bar 266 and thereby avoid its binding within the recess of the guide block 267. The support arm 265 and its cooperating slide bar 266 are therefore freely movable in a vertical path of travel by reason of the mounting of the slide bar 266.

As previously mentioned, the support arm 265 overlies the plate 220 of the elevator mechanism 215. When the conveyor mechanism 25 locates the package upon the elevator mechanism 21, the package actually rests upon the support arm 265 and the latter in turn, rests upon the plate 220 of the elevator mechanism 215. When the elevator mechanism 215 raises the package toward the folders 240, it raises the support arm 265 and its associated slide bar 266 with it, the cam surface 269 of the cam 56 being out of engagement with its cooperating roller 268 during this upward movement of the support arm 265 and the latter is therefore actuated in its upward movement solely by the operation of the elevator cam 165. The elevator mechanism 215 therefore raises the support arm 265 to the position shown in Figure 15, and as previously mentioned, when the folders 240 make initial contact with the edges of the package that is being wrapped, the folders 240 serve to support the package in its upper position. The cam 165 then operates to cause the elevator bar 218 and its associated plate 220 to move downwardly away from the package.

Before the downward movement of the elevator bar 218 is initiated, the support arm cam 56 moves into a position wherein its cam surface 269 engages the roller 268 to support the slide bar 266 and its associated support arm 265 to prevent the latter from moving downwardly with the elevator bar 218. Thus, the support arm 265 remains in engagement with the central portion of the package to assist in supporting it while the folders 240 are operating upon its underside to prevent the center of the package from sagging as would occur in some instances if the central support were not provided for the package. The support arm 265 is substantially narrower than the plate 220 so that it does not interfere with the operation of the folders 240 but permits them to perform their function of folding the extending ends 160 to the underside of the package and sealing them in that position. After the folders 240 have completed their operation and assume the position underneath the package as illustrated in Figure 12, the cam surface 269 moves out of engagement with the roller 268 permitting the slide bar 266 and its associated support arm 265 to move downwardly. The downward movement of the support arm 265 is limited by its engagement with the plate 220, and it rests thereupon ready to receive the next package to be wrapped and repeat the cycle.

As previously mentioned the elevator mechanism 215 moves the package that is being wrapped from the level of the conveyor 25 upwardly for operation upon by the two folders 240 which function to fold the extending ends 160 of the wrapping material to the underside of the package and seal it in that position. Each of the folders 240 operates in the same manner and both are actuated by identical mechanisms oppositely disposed on either side of the elevator mechanism 215 as best seen in Figure 3. Each of these mechanisms comprises a bracket 280 pivotally supported by a pin 281 extending axially from a plate 282 which is mounted on the bracket 125. The bracket 280 extends downwardly from the pin 281 and has another pin 283 attached to its lower end for rotatably supporting a roller 284 in position to contact the cam surface 176 of the folder cam 175. A bar 285 is fixed to the bracket 280 immediately above the roller 284 to extend outwardly therefrom for the purpose of supporting a pin 286 at its extending end for receiving one end of a coil spring 287. The other end of the coil spring 287 is attached to the bracket 125 by a pin 288. The spring 287 therefore serves to urge the bracket 280 in a pivotal movement about the pin 281 to retain the roller 284 in contact with the cam surface 176.

The bracket 280 extends upwardly from its pivot point as established by the pin 281 and is shaped at its upper end to present an upper, somewhat horizontal leg 292 which supports the folder 240 at its extremity. Initially, the two folders 240 are in their retracted position toward the sides of the machine with a maximum amount of space between them. When the elevator mechanism 215 begins to raise the package that is being wrapped, the cams 175 operate to actuate the brackets 280 in their pivotal movement to move the two folders 240 in an arcuate path toward each other in the direction of the center of the machine. This movement causes each of the folders 240 to contact the top edge of the package just before it reaches its uppermost position, and while the elevator 215 raises the package its remaining distance, the folders 240 draw the wrapping material tightly about the top of the package and engage the extending ends 160 which have been moved downwardly by the draw arms 241. When the elevator mechanism 215 reaches its upper limit of movement, the folders 240 are located along the bottom edge of the package as illustrated in Figure 15, and from this position move inwardly toward each other to fold the extending ends 160 underneath the package and seal them in that position.

As illustrated in Figures 11 and 12, this folding operation is performed in cooperation with two pair of abutment members 292 and 293. As previously mentioned, the wrapping machine of the present invention is especially adapted to wrap food which has been placed in either the trays 121 or the flat boards 122 for self service food markets. Since the trays include upwardly extending sides which are not a part of the flat boards 122, the trays 121 are of greater height than the flat boards 122. The two pair of abutments 292 and 293 accommodate this difference in height, the abutments 292 being fixed at the desired height for operating upon the tray 121 as shown in Figure 11, while the abutments 293 are movable into position beneath the abutments 292 for operating upon the flat boards 122 as depicted in Figure 12.

Such operation is accomplished by mounting each of the tray abutments 292 on a plate 294 with the abutments 292 being oppositely disposed and parallel to each other in the same plane in position to be engaged by the edges of the tray 121 while the folders 240 are operating on it. On the other hand, the flat board abutments 293 are each supported by a plate 295 and each plate 295 is attached to one of the plates 294 by hinges 296 to render the plates 295 pivotable relative to the plates 294. With this arrangement, the plates 295 may be pivoted upwardly and outwardly of the plates 294 as shown in Figures 11 and 15, to render their associated abutments 293 inoperative when the merchandise that is being wrapped is contained in trays 121. With the plates 295 thus positioned, the flat board abutments 293 are disposed above and to the outside of the tray abutments 292 where they will not interfere with the operation of the latter.

When the merchandise that is being wrapped is contained on the flat boards 122, the cooperating abutments must be lower to accommodate the decreased height of the flat boards 122, and the flat board abutments 293 are therefore placed in their operative position beneath the tray abutments 292. This is accomplished by pivoting the plates 295 downwardly adjacent to the plates 294 as illustrated in Figures 3 and 12. With the plates 295 thus positioned their associated abutments 293 are located sufficient distance beneath the abutments 292 to accommodate the flat boards 122 and the tray abutments 292 are rendered inoperative. The flat board abutments 293 are retained in their operating position by spring snaps 297 that are attached to the plates 295 in position to engage the edges of the fixed plates 294 as shown in Figure 8 when the plates 295 are pivoted downwardly to locate the tray abutments 293 in operating position. The spring snaps 297 therefore yieldably retain the plates 295 in position and prevent them from pivoting away from this position.

The two pair of abutments 292 and 293 are also mounted for simultaneous horizontal movement toward and away from each other and are connected to be actuated in this movement in conjunction with the movement of the folders 240. In this movement one abutment 292 and one abutment 293 move together in one direction while the other abutments 292 and 293 move together in the opposite direction. Thus, the two abutments 292 move horizontally toward and away from each other, and likewise the two abutments 293 are adapted for movement in unison with the abutments 292 toward and away from each other in a horizontal plane.

The two mechanisms for supporting and effecting a horizontal movement of the two pair of abutments 292 and 293 are oppositely disposed on either side of the center of the machine and are identical in construction. Each of these mechanisms comprise a plate 301 to which the fixed plate 294 is secured and the plate 301 is fixed to the end of a pair of supports 302 as clearly shown in Figure 8. The supports 302 are attached to a T shaped slide 303 at the crossbar portion of the T, on either side of the leg of the T, by suitable screws 304. A pair of plates 305 are attached to the underside of the slide 303, with one of the plates 305 being supported at each end of the crossbar of the T formed by the slide.

Each of the plates 305 serves to carry two depending pins 310, each of which rotatably supports a roller 311. Each of the rollers 311 is provided with two flanges 312 as shown in Figure 3, for the purpose of straddling a pair of slide bars 313 and 314, with the flanges 312 of the two rollers 311 on one of the plates 305 straddling the slide bar 313, and the flanges of the two rollers on the other plate 305 straddling the slide bar 314. The proper spacing of the slide bars 313 and 314 is maintained by a pair of crossbars 315 and 316 with the crossbar 315 being attached to the inner ends of the slide bars 313 and 314, and the crossbar 316 being attached to the outer ends of the slide bars 313 and 314.

As best shown in Figure 3, the slide bars 313 and 314 constitute the upper leg of a U shaped bracket 320 positioned so that its two legs are horizontally rather than vertically disposed. Its lower leg 321 is attached at its free end to the crossbar 126 by a plate 322 which is secured to both the crossbar 126 and the leg 321 by suitable screws 323. By virtue of this connection to the crossbar 126, the entire mechanism supported by the brackets 320 is adjustable with the brackets 125, so that the two oppositely disposed mechanisms on either side of the center of the machine will move toward each other or away from each other with the brackets 125 to vary the spacing between them in accordance with the size of the tray 121 or flat board 122 being employed with the package.

The flanged rollers 311 serve to support the slide 303 for horizontal sliding movement along the slide bars 313 and 314 for the purpose of moving the two pair of abutment members 292 and 293 into and out of operating position. As previously mentioned, this movement is effected in conjunction with the movement of the folders 240, and to this end as shown in Figures 3 and 8, an upstanding rod 328 is secured at one end to the leg 292 of the pivotable bracket 280, and extends upwardly from the top surface of the leg 292 through a slot 329 centrally formed in the slide 303 to extend above the slide. The upper end of the rod 328 has attached to it one end of a coil spring 330, the other end of which is attached to the T-shaped slide 303 at the outer extremity of the leg portion of the T.

As the leg 292 pivots inwardly to move the folder 240 toward the package, the rod 328 moves with it to move the slide 303 inwardly with it by reason of its connection therewith through the spring 330. The latter is of sufficient strength to pull the slide 303 inwardly without expanding appreciably until such movement of the slide is terminated by the crossbar 315 which extends upwardly from its connection with the slide bars 313 and 314 as illustrated in Figure 3, in the path of movement of the slide 303 to serve as a limit stop for the slide.

As previously described, the plates 305 are secured to the slide 303 to move with it, and the slide 303 will move inwardly with the folders 240 until the inner edge of the slide 303 strikes the crossbar 315, as shown in Figure 3, to prevent its further inward movement. The two pair of abutments 292 and 293 are also carried by the slide 303 to move with it as described. When the slide 303 is in its extreme inward position as established by the crossbar 315, either pair of abutments 292 or 293 are accurately positioned directly above the edge of the tray 121 or flat board 122 respectively, to cooperate with the associated folders 240 for folding the extending ends 160 underneath the tray 121 or flat board 122 in a manner to be described. However, after the abutments 292 and 293 have been thus positioned, the folders 240 may continue their inward movement toward each other by reason of their yieldable connection with the slide 303 through the spring 330.

When the slide 303 has reached its inner limit of movement, the folder 240 reaches the position shown in Figure 3, where it contacts the bottom edge of the tray 121 or flat board 122. Since the folding mechanism is duplicated on the other side of the machine, the second folder 240 is likewise contacting the underside of the tray 121 or flat board 122 at its opposite edge, so that the two folders 240 cooperate to support the package. When they reach this position, to support the package, the elevator cam 165 operates to initiate downward movement of the elevator bar 218, to lower the plate 220 out of the path of movement of the folders 240, and locate it for receiving the succeeding package from the conveyor 25. However, as previously described the moment that the elevator bar 218 initiates its downward movement, the support arm cam 56 engages its cooperating roller 268 to retain the support arm 265 along the center of the underside of the package to provide support for the package at its central portion while the folders 240 are operating along its edges.

Suitable heating elements (not shown) are embedded in the folders 240 and each is connected to a source of electrical energy by conductors 331 as shown in Figures 11 and 12. The heating elements function, when energized, to heat the entire surface of the folders 240, and the heat is utilized for fusing the wrapping material to bind the folds of the wrapping material together along the edge and underside of the package. The folders 240 travel in an arcuate path about the pins 281, and as previously mentioned, first contact the package at its upper edge before the elevator mechanism 215 has completed moving the package to its uppermost position. While the tray is being moved to its uppermost position as shown in Figure 15, the folders 240 draw the wrapping material down tightly about the top of the package. When the package reaches its uppermost position, the folders are contacting it along its bottom edge and move inwardly from this position toward each other along the underside of the package.

As the folders 240 continue in their arcuate path of travel along the underside of the package, they raise the package slightly so that its two upper edges move into contact with either the abutments 292 or the abutments 293 depending upon which is operatively disposed, and apply pressure against the underside of the package while the heat of the folders 240 is fusing the wrapping material to bind the several folds together underneath the package. The folders 240 move toward each other until their edges have a small space between them as illustrated in Figures 11 and 12, but as they approach each other they begin traveling in the downward direction of their arcuate movement, so that when they reach their maximum inward position as illustrated in Figures 11 and 12, they are depressed just sufficiently to release their pressure upon the package against either the abutments 292 or the abutments 293. The package is then resting freely upon the two folders 240, and is slid off of the folders by the primary transfer mechanism 64 onto the hot plate 85.

The extending ends 160 of the wrapping material are of sufficient length to overlap underneath the package, but obviously such overlapping cannot be performed by the folders 240. Therefore, when the folders 240 reach their maximum inward position, the extremities of the ends 160 are extending downwardly from the center of the package between the two folders 240 as shown in Figures 11 and 12. In order to fold these downwardly extending extremities flat against the underside of the package, the primary transfer mechanism 64 moves the package off of the folders 240 and passes it over a notched plate 335 which is shown in Figure 9, the transfer mechanism 64 passing the package over the plate 335 while it is moving it on its way to the hot plate 85. The plate 335 is rigidly supported by the frame 20 and is provided with a V notch 336. When the package is moved off of the folders 340, the downwardly extending extremities of the ends 160 pass between the folders 240 into the V notch 336 to be flattened against the underside of the package as they pass over the plate 335.

Movement of the package by the primary transfer mechanism 64 continues until it reaches the hot plate 85, when the transfer mechanism 64 releases it to permit it to rest upon the hot plate 85. The latter is provided with suitable heating elements (not shown) to heat its top surface in well known manner. The heat functions to fuse the several folds of wrapping material located at the underside of the tray to securely bind them together and effectively seal the package. The package rests upon the hot plate 85 for only a moment, just sufficient to fuse the wrapping material at the underside of the package and not long enough to permit any significant amount of heat to penetrate into the merchandise which is contained in the tray 121 or on the flat board 122 as the case may be. After the package has rested upon the hot plate 85 the desired period of time, the secondary transfer mechanism 65 operates to move it off of the hot plate onto the grid 86 depicted in Figure 1, the secondary transfer mechanism 65 being operated in timed relationship to the operation of the primary transfer mechanism 64 so that the underside of the package is accurately subjected to the proper amount of heat for fusing the wrapping material without heating the merchandise contained therein. The cooling grid 86 functions to transfer the heat from the underside of the package to accelerate its cooling and further minimize the possibility of transmitting heat to its contents. When the package reaches the cooling grid 86, the wrapping operation is completed, and it is ready to be placed in a display case.

The primary transfer mechanism 64 which functions to transfer the package from the folders 240 to the hot plate 85 is actuated by the rotation of the shaft 77 with the latter being rotated by power transmitted from the cam shaft 47 as previously described. As shown in Figure 1, the transfer mechanism 64 includes a sprocket 340 keyed to the shaft 77 to rotate with it. An idler sprocket 341 is rotatably mounted on a shaft 342 supported by the upper extension 79 of the frame 20. The idler sprocket 341 and the drive sprocket 340 are in meshing engagement with an endless chain 343, with the two sprockets defining the ends of the loops formed by the chain.

A pusher 344 is carried by the chain 343 and extends outwardly from the periphery of the chain to engage the package resting upon the folders 240. The pusher 344 moves with the chain 343 in its loop, and as it does so it slides the package from the folders onto the hot plate 85. When the pusher 344 has located the package in its proper position upon the hot plate 85, a tripping mechanism 345 functions to release the pusher 344, permitting it to pivot out of its operating position, to release the package, the operation of the tripping mechanism 345 being more fully described in our previously mentioned co-pending patent application, Serial Number 452,593, filed on August 27, 1954.

In order to insure that the secondary transfer mechanism 65 operates in exact timed relationship with the operation of the primary transfer mechanism 64, the former is driven by the shaft 77 which also serves to drive the primary transfer mechanism 64. As previously mentioned, and best seen in Figure 2, the shaft 77 rotates the sprocket 87 to drive its cooperating chain 89 and thereby cause a like rotation of the sprocket 88. Since the sprocket 88 is keyed to the shaft 90 the latter rotates with it to rotate two sprockets 350 and 351 which are keyed to the shaft 90. Three sprockets 352 are rotatably supported by the upper extension 79 of the frame 20 in the same plane that the sprocket 350 is located in, and an endless chain 353 is in meshing engagement with the sprocket 350 and the three sprockets 352 which establish the path of travel of the chain.

In like manner, three idler sprockets 357 are rotatably supported by the opposite side of the upper extension 79 of the frame 20 in the same plane that the sprocket 351 is located in. An endless chain 358 is in meshing engagement with the sprocket 351 and the three idler sprockets 357 to form a loop established by these sprockets. The axis of each of the idler sprockets 357 is in alignment with the axis of one of the sprockets 352, and since the axis of the drive sprocket 351 is in alignment with the axis of the drive sprocket 350, the loop defined by the chain 358 conforms to the loop defined by the chain 353 and the two loops are in alignment with each other. Furthermore, since the sprockets 350 and 351 are both keyed to the shaft 90, and the endless chain 353 is driven by the sprocket 350 while the endless chain 358 is driven by the sprocket 351, the two chains operate in unison at the same rate of travel.

The actual movement of the package from the hot plate 85 onto the grill 86 is effected by a pusher member 360 which is mounted on a pusher support bar 361 that is attached at one end to the endless chain 353 and at its opposite end to the endless chain 358 as shown in Figure 2. The bar 361 and its associated pusher member 360 therefore move with the two chains 353 and 358, and as the pusher member 360 traverses its lowermost horizontal path of the loop in which it travels, it engages a package located on the hot plate 85 and slides it off of the hot plate onto the cooling grid 86. The wrapping operation is then completed and the package may be removed to be placed on display or in storage.

As previously described, the conveyor 25 pushes the package into the folding mechanism 30 so that the front sides 185 of the extending ends 160 are moved against the front tuckers 187 for tucking the sides inwardly toward the center of the package. Since the location of the conveyor 25 is fixed and the path of travel of its pushers 115 is likewise fixed, the pushers will release the edge of the package with which they are in contact at the same position regardless of the size of the package, and the location of the opposite side of the package will therefore vary with a variance in the length of the package. The position of the tuckers 187 must therefore be adjusted longitudinally of the machine to conform to the various lengths of trays 121 or flat boards 122 as well as laterally to accommodate a change in the width of the trays or flat boards.

Lateral adjustment is achieved by moving the brackets 125 as previously described since these brackets support the tuckers 187. When the hand crank 140 is rotated to adjust the mechanism, it is only necessary to set the pointer 158 on the proper graduation of the scale 157 for the particular size tray or flat board being wrapped, and the tuckers 187 will move laterally with the rest of the mechanism to achieve the proper lateral spacing for the width of the particular size tray 121 or flat board 122.

Longitudinal adjustment of the front tuckers 187 must be performed separately however, by manipulation of a handle 365 to actuate the mechanism illustrated in Figure 9. The handle 365 is pivotally supported by a pin 366 extending upwardly from the frame 20 and is provided with an indicator 367 for cooperation with a graduated scale 368 which is graduated to cooperate with the indicator 367 for indicating the proper position for a particular size tray or flat board in the same manner that the pointer 158 indicates the proper spacing of the brackets 125 and their associated mechanism for a specific size tray 121 or flat board 122. The handle 365 is coupled to the two slide bars 196 by a linkage 370 so that pivotal movement of the handle 365 will serve to effect longitudinal movement of each of the two slide bars 196 which are supported respectively by the two slide blocks 258 for sliding movement.

Each of the two front tuckers 187 is supported at the forward end of one of the slide bars 196 so that they will move with them to effect their adjustment longitudinally of the machine. Therefore, by simply moving the handle 365 and its associated indicator 367 to the position indicated on the graduated scale 368, the proper longitudinal position of the front tuckers 187 will be obtained for the particular size tray 121 or flat board 122 that is being employed for the package. A thumb screw 369 is provided for threaded engagement with a stud extending upwardly from the handle 365 through a slot 371 in the plate of the graduated scale 368 to lock the handle in the selected position.

Summarizing a cycle of operation of the machine to perform a wrapping operation, the package is placed upon the conveyor 25 with a sheet of wrapping material placed about it having two of its diagonally opposite corners secured together at the underside of the package. This leaves the two ends 160 of the wrapping material extending laterally from the package. The conveyor 25 then functions to move the package into the folding mechanism 30 for effecting the wrapping operation.

The conveyor 25 moves the front sides 185 of the extending ends 160 against the front tuckers 187 to tuck them inwardly toward the center of the package, and the cams 177 actuate the rear tuckers 205 to similarly tuck the rear sides 186 of the extending ends 160. While the rear sides 186 of the extending ends 160 are being tucked inwardly, the elevator mechanism 215 functions to raise the package with its ends 160 still extending for operation upon by the folders 240. At the same time that the elevator mechanism 215 is raising the package, it also raises the support arm 265 with it to position it for supporting the center portion of the package while the folders 240 are operating upon it.

Before the elevator mechanism 215 raises the package sufficiently for the folders 240 to operate upon it, it passes the package between the two draw arms 241 which serve to move the extending ends 160 of the wrapping material downwardly and crease it along the edge of the tray to prepare these extending ends for operation upon by the folders 240. Therefore, when the package reaches its uppermost position, the extending ends 160 are extending downwardly rather than laterally so that they are in an ideal position to be engaged by the folders 240. At the same time that the package is being raised to its upper position by the elevator mechanism 215, the folder cams 175 operate to initiate movement of the folders 240. The folders 240 draw the wrapping material tightly about the top of the package and fold the now downwardly extending ends 160 underneath the tray while applying heat to the wrapping material to bind its folds together at the underside of the tray.

When the folders 240 have completed their operation, the primary transfer mechanism 64 slides the package off of the folders 240 which are now supporting it with the extremities of the extending ends 160 extending downwardly from the central portion of the package between the folders 240. The primary transfer mechanism moves the package over the plate 335 on its way to the hot plate 85 for the purpose of folding these extremities to the underside of the package. The hot plate 85 applies heat to the wrapping material at the underside of the package to fuse it and thereby securely bind it together to complete the wrapping operation. After the package has rested upon the hot plate 85 a sufficient length of time to adequately fuse the wrapping material at the underside of the package, the secondary transfer mechanism 65 moves the package off of the hot plate 85 in order to avoid the transmission of an excessive amount of heat to the contents of the package. The secondary transfer mechanism 65 moves the package from the hot plate 85 onto the cooling grid 86 which serves to accelerate the cooling of the underside of the package, and the latter is then removed from the machine for display or storage purposes.

From the foregoing detailed description of the structure and operation of the illustrative embodiment of the present invention, it will be apparent that there has been provided a new and improved semi-automatic wrapping machine which is especially adapted to wrap food which has been placed in trays or on flat boards in a transparent heat sensitive wrapping material, to form a neat and efficiently sealed package which is particularly well suited to be placed on display in self service food markets where the customer may conveniently select the desired package.

Although the illustrative embodiment of the invention has been described in considerable detail for the purpose of making a full disclosure of a practical operative structure by means of which the invention may be practised, it is to be understood that various novel features of the invention may be incorporated in other structural forms without departing from the spirit and scope of the invention as defined in the subjoined claims.

The principles of the invention having now been fully explained in connection with the foregoing description of the illustrative embodiment, the invention is hereby claimed as follows:

1. In an apparatus for wrapping an article in a sheet of heat sensitive wrapping material; a table; a tray resting on said table for containing the sheets of wrapping material; a hot plate operably attached to said table so that the operator may place a sheet of the wrapping material about the article to be wrapped and fuse two diagonally opposite corners of the wrapping material together at the underside of the article by the application of heat from said hot plate leaving the other two diagonally opposite corners of the wrapping material extending outwardly from two sides of the article; a folding mechanism operably connected to fold the two extending corners of said wrapping material to the underside of the article; a conveyor mounted in position to receive the article with a sheet of wrapping material placed about it from said table and convey it to said folding mechanism for operation upon by said folding mechanism; a second hot plate supported adjacent to said folding mechanism on the side opposite said conveyor for fusing the corners of the wrapping material that were operated upon by said folding mechanism to secure these corners at the underside of the article to seal the package; a transfer mechanism operable to transfer the article from said folding mechanism to said second hot plate for fusing the corners of the wrapping material at the underside of the article to seal the package; and a second transfer mechanism operably connected to transfer the article from said second hot plate to a cooling grid to dissipate the heat applied to the underside of the article by said second hot plate.

2. In an apparatus for wrapping an article in a sheet of heat sensitive wrapping material; a pre-wrap table; a tray resting on said prewrap table for containing the sheets of wrapping material; a hot plate operable attached to said table and disposed in spaced relationship to an edge of said table so that the operator may place a sheet of the wrapping material about the article to be wrapped and fuse two diagonally opposite corners of the wrapping material together at the underside of the article by the application of heat from said hot plate leaving the other two diagonally opposite corners of the wrapping material extending outwardly from two sides of the article; a folding mechanism operably connected to fold the two extending corners of said wrapping material to the underside of the article; an elevator mechanism operably connected to raise the article to be wrapped to said folding mechanism for operation upon by said folding mechanism; a conveyor mounted in position to receive the article with a sheet of wrapping material placed about it and convey it from said table to deposit it upon said elevator mechanism; a second hot plate supported adjacent to said folding mechanism on the side opposite said conveyor for fusing the corners of the wrapping material that were operated upon by said folding mechanism to secure these corners at the underside of the article to seal the package; a transfer mechanism mounted in position to transfer the article from said folding mechanism to said second hot plate for fusing the wrapping material at the underside of the article to seal the package; a cooling grid mounted in position to receive the article from said second hot plate to dissipate the heat applied to the underside of the article by said second hot plate; and a second transfer mechanism operably connected in position to transfer the article from said second hot plate to said cooling grid.

3. In an apparatus for wrapping an article in a sheet of heat sensitive wrapping material; a frame; a source of power; a conveyor supported by said frame and connected to be actuated by said source of power, said conveyor being adapted to receive the article to be wrapped with a sheet of wrapping material secured about it and having two diagonally opposite corners extending from two respective sides of the article; a cam shaft rotatably supported by said frame and connected to be rotated by said source of power; a plurality of folder cams mounted on said cam shaft to rotate with it; a secondary cam shaft rotatably supported by said frame and connected to be rotated by said source of power; a folding mechanism operably supported by said frame and connected to be actuated by said folder cams to fold the extending corners of the wrapping material to the underside of the article; an elevator mechanism slidably supported by said frame for vertical movement in position to receive the article with the sheet of wrapping material about it from said conveyor; an elevator cam mounted on said cam shaft to rotate with it and in engagement with said elevator mechanism to move said elevator mechanism upwardly after it receives the article from said conveyor to raise the article with the sheet of wrapping material about it for operation upon by said folding mechanism; a support arm slidably supported by said frame for vertical movement and connected to be raised by said elevator mechanism while it is disposed underneath the article being wrapped while the latter is being raised by said elevator mechanism; a support arm cam keyed to said secondary shaft to rotate with it in position to engage said support arm to retain said support arm in its upper position after said elevator mechanism moves downwardly, said support arm serving to support the article being wrapped when in its upper position while said folding mechanism is operating to fold the extending ends of the wrapping material to the under side of the article; a hot plate supported by said frame for fusing the wrapping material at the underside of the article to seal the package; a transfer mechanism actuated by said source of power and connected to be mounted in position on said frame to transfer the article from said folding mechanism to said hot plate; a cooling grid mounted in position to receive the article from said hot plate to dissipate the heat applied to the underside of the article by said hot plate; and a second transfer mechanism operably connected to be actuated by said source of power and to transfer the article from said hot plate to said cooling grid.

4. In an apparatus for wrapping an article in a sheet of heat sensitive wrapping material; a frame; a source of power; an elevator mechanism adapted to receive the article being wrapped with a sheet of wrapping material secured about it and having two diagonally opposite corners extending from two respective sides of the article, said elevator mechanism being slidably supported by said frame for vertical movement and connected to be actuatd by said source of power in an upward movement to raise the article on it to an upper position; a folding mechanism operably supported by said frame and connected to be actuated by said source of power to fold and seal the extending corners of the wrapping material to the underside of the article while the article is in its upper position as established by said elevator mechanism; a support arm slidably supported by said frame for vertical movement and connected to be raised by said elevator mechanism with the article being wrapped and while it is disposed underneath the article being wrapped; and support arm retaining means connected to be actuated by said source of power into engagement with said support arm to retain said support arm in its upper position after said elevator mechanism moves downwardly, said support arm serving in its upper position to support the article being wrapped while said folding mechanism is operating to fold the extending ends of the wrapping material to the underside of the article.

5. In an apparatus for wrapping an article in a sheet of heat sensitive wrapping material; a frame; a source of power; an elevator mechanism adapted to receive the article being wrapped with a sheet of wrapping material secured about it and having two ends extending from two respective sides of the article, said elevator mechanism being slidably supported by said frame for vertical movement and connected to be actuated by said source of power in an upward movement to raise the article on it to an upper position; a plurality of guide rollers rotatably supported by said elevator mechanism in position so that their peripheries engage said frame to roll along the frame for guiding said elevator mechanism in its vertical movement; a folding mechanism operably supported by said frame and connected to be actuated by said source of power to fold and seal the extending ends of the wrapping material to the underside of the article while the article is in its upper position as established by said elevator mechanism; a support arm slidably supported by said frame for vertical movement and connected to be raised by said elevator mechanism with the article being wrapped and while it is disposed underneath the article being wrapped; a support arm guide roller rotatably mounted on said support arm in position so that its periphery engages said frame to roll along said frame as said support arm is moved for guiding said support arm in its vertical movement; and support arm retaining means connected to be actuated by said source of power into engagement with said support arm to retain said support arm in its upper position after said elevator mechanism moves downwardly, said support arm serving in its upper position to support the article being wrapped while said folding mechanism is operating to fold the extending ends of the wrapping material to the underside of the article.

6. In an apparatus for wrapping an article in a sheet of heat sensitive wrapping material; a frame; a source of power; an elevator mechanism adapted to receive the article being wrapped with a sheet of wrapping material secured about it with two ends of the wrapping material extending laterally from two sides of the article, said elevator mechanism being slidably supported by said frame for vertical movement and connected to be actuated by said source of power in an upward movement to raise the article on it to an upper position; a pair of draw arms supported by said frame in spaced relationship with their spacing corresponding to the width of the article being wrapped and located in the path of movement of the article as it is being moved upwardly by said elevator mechanism so that the article passes between said draw bars in its upward movement to cause the extending ends of the wrapping material to be drawn downwardly relative to the article; and a folding mechanism operably supported by said frame and connected to be actuated by said source of power to move the extending corners of the wrapping material that have been moved downwardly by said draw arms to the underside of the article and seal the wrapping material by the application of heat at the underside of the article while the article is in its upper position as established by said elevator mechanism.

7. In an apparatus for wrapping an article in a sheet of heat sensitive wrapping material; a frame; a source of power; an elevator mechanism adapted to receive the article being wrapped with a sheet of wrapping material secured about it with two ends of the wrapping material extending laterally from two opposite sides of the article, said elevator mechanism being slidably supported by said frame for vertical movement and connected to be actuated by said source of power in an upward movement to raise the article on it to an upper position; a pair of draw arms supported by said frame in spaced relationship with their spacing corresponding to the width of the article being wrapped and located in the path of movement of the article as it is being moved upwardly by said elevator mechanism so that the article passes between said draw bars in its upward movement to cause the extending ends of the wrapping material to be drawn downwardly relative to the article; a folding mechanism operably supported by said frame and connected to be actuated by said source of power to move the extending corners of the wrapping material that have been moved downwardly by said draw arms to the underside of the article and seal the wrapping material by the application of heat at the underside of the article while the article is in its upper position as established by said elevator mechanism; a support arm slidably supported by said frame for vertical movement and connected to be raised by said elevator mechanism with the article being wrapped and while it is disposed underneath the article being wrapped; and support arm retaining means connected to be actuated by said source of power into engagement with said support arm to retain said support arm in its upper position after said elevator mechanism moves downwardly, said support arm serving in its upper position to support the article being wrapped after it is released by said elevator mechanism and while said folding mechanism is operating to fold the extending ends of the wrapping material to the underside of the article.

8. In an apparatus for wrapping an article in a sheet of heat sensitive wrapping material; a frame; a source of power; a conveyor supported by said frame and connected to be actuated by said source of power, said conveyor being adapted to receive the article to be wrapped with a sheet of wrapping material secured about it with two opposite sides of the article; a cam shaft rotatably supported by said frame and connected to be rotated by said source of power; a plurality of folder cams mounted on said cam shaft to rotate with it; a secondary cam shaft rotatably supported by said frame and connected to be rotated by said source of power; an elevator mechanism slidably supported by said frame for vertical movement in position to receive the article with the sheet of wrapping material about it from said conveyor; an elevator cam mounted on said cam shaft to rotate with it and in engagement with said elevator mechanism to move said elevator mechanism upwardly after it received the article from the conveyor with the sheet of wrapping material about it to raise the article to an upper position; a pair of draw arms supported by said frame in spaced relationship with their spacing corresponding substantially to the width of the article being wrapped and located in the path of movement of the article as it is being moved upwardly by said elevator mechanism so that the article passes between said draw bars in its upward movement to cause the extending ends of the wrapping material to be drawn downwardly relative to the article; a folding mechanism operably supported by said frame and connected to be actuated by said folder cams to move the extending ends of the wrapping material that have been moved downwardly by said draw arms to the underside of the article and seal the wrapping material by the application of heat at the underside of the article while the article is in its upper position as established by said elevator mechanism; a support arm slidably supported by said frame for vertical movement and connected to be raised by said elevator mechanism with the article being wrapped and while it is disposed beneath the article being wrapped; a support arm cam mounted on said secondary cam shaft to rotate with it in position for engaging said support arm to retain said support arm in its upper position after said elevator mechanism moves downwardly and to release said support arm for downward movement after said folding mechanism has completed its operation, said support arm serving in its upper position to support the article being wrapped after the article is released by said elevator mechanism and while said folding mechanism is operating to fold the extending ends of the wrapping material to the underside of the article; a hot plate supported by said frame for fusing the wrapping material at the underside of the article to seal the package; and a transfer mechanism supported by said frame and connected to be actuated by said source of power in position to transfer the article from said folding mechanism to said hot plate.

9. In an apparatus for wrapping an article in a sheet of heat sensitive wrapping material; a frame; a source of power; an elevator mechanism adapted to receive the article being wrapped with a sheet of wrapping material secured about it with two ends of the wrapping material extending laterally from two sides of the article, said elevator mechanism being slidably supported by said frame for vertical movement and connected to be actuated by said source of power in an upward movement to raise the article on it to an upper position; a pair of brackets supported by said frame in spaced relationship for lateral pivotal movement toward and away from each other; a draw arm mounted on each of said brackets to extend outwardly therefrom in parallel spaced relationship for movement with said brackets toward and away from each other to vary their spacing for accommodating articles of different width so that said draw arms may be spaced to correspond approximately with the width of the article being wrapped, said draw arms being located in the path of movement of the article as it is being moved upwardly by said elevator mechanism so that the article passes between said draw bars in its upward movement to cause the extending ends of the wrapping material to be drawn downwardly relative to the article; and a folding mechanism operably supported by said frame and connected to be actuated by said source of power to move the extending ends of the wrapping material that have been moved downwardly by said draw arms to the underside of the article and seal the wrapping material by the application of heat at the underside of the article while the article is in its upper position as established by said elevator mechanism.

10. In an apparatus for wrapping an article in a sheet of heat sensitive wrapping material; a frame; a source of power; an elevator mechanism adapted to receive the article being wrapped with a sheet of wrapping material secured about it with two ends of the wrapping material extending laterally from two sides of the article, said elevator mechanism being slidably supported by said frame for vertical movement and connected to be actuated by said source of power in an upward movement to raise the article on it to an upper position; a pair of brackets supported by said frame in spaced relationship for lateral pivotal movement toward and away from each other; a draw arm mounted on each of said brackets to extend outwardly therefrom in parallel spaced relationship for movement toward and away from each other with the pivotal movement of said brackets to vary their spacing for accommodating articles of different width so that said draw arms may be spaced to correspond substantially with the width of the article being wrapped, said draw arms being located in the path of movement of the article as it is being moved upwardly by said elevator mechanism so that the article passes between said draw bars in its upward movement to cause the extending ends of the wrapping material to be drawn downwardly relative to the article; a pair of springs each connected at one end to said frame and at its opposite end to said bracket in a central position to yieldably retain said bracket in its maximum pivotal position in either direction; adjusting screws supported in position to be abutted by said brackets to establish their limits of pivotal movement in each direction, said screws being adjustable to vary the limits of movement of said brackets to thereby adjust the maximum and minimum spacing of said draw bars; and a folding mechanism operably supported by said frame and connected to be actuated by said source of power to move the downwardly extending ends of the wrapping material to the underside of the article and seal the wrapping material by the application of heat at the underside of the article while the article is in its upper position as established by said elevator mechanism.

11. In an apparatus for wrapping an article in a sheet of heat sensitive wrapping material; a frame; a source of power; a conveyor supported by said frame and connected to be actuated by said source of power, said conveyor being adapted to receive the article to be wrapped with a sheet of wrapping material secured about it with two ends of the wrapping material extending laterally from two opposite sides of the article; a cam shaft rotatably supported by said frame and connected to be rotated by said source of power; a plurality of folder cams mounted on said cam shaft to rotate with it; a secondary cam shaft rotatably supported by said frame and connected to be rotated by said source of power; an elevator mechanism slidably supported by said frame for vertical movement in position to receive the article with the sheet of wrapping material about it from said conveyor; an elevator cam mounted on said cam shaft to rotate with it and in engagement with said elevator mechanism to move said elevator mechanism upwardly after it receives the article from the conveyor with the sheet of wrapping material about it to raise the article to an upper position; a pair of brackets supported by said frame in spaced relationship for lateral pivotal movement toward and away from each other; a draw arm mounted on each of said brackets to extend outwardly therefrom in parallel spaced relationship for movement with said brackets toward and away from each other to vary their spacing for accommodating articles of different width so that said draw arms may be spaced to correspond substantially with the width of the article being wrapped, said draw arms being located in the path of movement of the article as it is being moved upwardly by said elevator mechanism so that the article passes between said draw bars in its upward movement to cause the extending ends of the wrapping material to be drawn downwardly relative to the article; a folding mechanism operably supported by said frame and connected to be actuated by said folder cams to move the downwardly extending ends of the wrapping material to the underside of the article and seal the wrapping material by the application of heat at the underside of the article while the article is in its upper position as established by said elevator mechanism; a support arm slidably supported by said frame for vertical movement and connected to be raised by said elevator mechanism with the article being wrapped and while it is disposed beneath the article being wrapped; a support arm cam mounted on said secondary cam shaft to rotate with it in position for engaging said support arm to retain said support arm in its upper position after said elevator mechanism moves downwardly and to release said support arm for downward movement after said folding mechanism has completed its operation, said support arm serving in its upper position to support the article being wrapped after the article is released by said elevator mechanism and while said folding mechanism is operating to fold the extending ends of the wrapping material to the underside of the article; a hot plate supported by said frame for fusing the wrapping material at the underside of the article to seal the package; and a transfer mechanism supported by said frame and connected to be actuated by said source of power in position to transfer the article from said folding mechanism to said hot plate.

12. In an apparatus for wrapping an article in a sheet of wrapping material; a frame; a source of power; a support for receiving the article to be wrapped with a sheet of wrapping material secured about it with two ends of the wrapping material extending laterally from two opposite sides of the article; a pair of folders oppositely supported by said frame for simultaneous movement toward and away from each other and connected to be actuated in their movement by said source of power in a path of travel to move to the underside of the article on said support as they approach each other to contact the oppositely extending ends of the wrapping material and move them to the underside of the article to envelop the article in the sheet of wrapping material; a pair of brackets carried by said frame; a pair of abutments each mounted on one of said brackets to be disposed in spaced relationship with their spacing accomodating the width of the article being wrapped and in position to limit the upward movement of the article as said folders are operating at the underside of the article to enable the folders to draw the wrapping material tightly along the underside of the article; and a second pair of abutments each pivotally supported by one of said brackets for pivotal movement selectively to an inoperative position and to an operative position wherein they render said first pair of abutments inoperative and occupy a position closer to said folders than said first pair of abutments do to accomodate articles of reduced height to likewise limit the upward movement of the article as said folders are operating at the underside of the article.

13. In an apparatus for wrapping an article in a sheet of wrapping material; a frame; a source of power; a support for receiving the article to be wrapped with a sheet of wrapping material secured about it with two ends of the wrapping material extending laterally from two opposite sides of the article; a cam shaft connected to be rotated by said source of power; a plurality of cams keyed to rotate with said cam shaft; a pair of folders oppositely supported by said frame for simultaneous movement toward and away from each other and connected to be actuated in their movement by said cams in a path of travel to move to the underside of the article on said support as they approach each other to contact the oppositely extending ends of the wrapping material and move them to the underside of the article to envelop the article in the sheet of wrapping material; a pair of brackets carried by said frame; a first pair of abutments each fixedly mounted on one of said brackets to be disposed in parallel spaced relationship with their spacing accomodating the width of the article being wrapped and in position to limit the upward movement of the article as said folders are operating at the underside of the article to enable the folders to draw the wrapping material tightly along the underside of the article; and a second pair of abutments each pivotally supported by one of said brackets for pivotal movement selectively to an inoperative position and to an operative position wherein they render said first pair of abutments inoperative and occupy a position closer to said folders than said first pair of abutments do to accommodate articles of reduced height to likewise limit the upward movement of the article as said folders are operating at the underside of the article.

14. In an apparatus for wrapping an article in a sheet of heat sensitive wrapping material; a frame; a source of power; an elevator mechanism adapted to receive the article being wrapped with a sheet of wrapping material secured about it with two ends of the wrapping material extending laterally from two sides of the article, said elevator mechanism being slidably supported by said frame for vertical movement and connected to be actuated by said source of power in an upward movement to raise the article on it to an upper position; a pair of draw arms supported by said frame in spaced relationship with their spacing corresponding substantially to the width of the article being wrapped and located in the path of movement of the article as it is being moved upwardly by said elevator mechanism so that the article passes between said draw bars in its upward movement to cause the extending ends of the wrapping material to be drawn downwardly relative to the article; a pair of folders oppositely supported by said frame for simultaneous movement toward and away from each other and connected to be actuated in their movement by said source of power in a path of travel to move to the underside of the article to contact the downwardly extending ends of the wrapping material and move them to the underside of the article to envelop the article in the sheet of wrapping material while the article is in its upper position as established by said elevator mechanism; a pair of abutment brackets carried by said frame; a first pair of abutments each fixedly mounted on one of said abutment brackets to be disposed in parallel spaced relationship with their spacing accommodating the width of the article being wrapped and in position to limit the upward movement of the article as said folders are operating at the underside of the article to enable the folders to draw the wrapping material tightly along the underside of the article; and a second pair of abutments each pivotally supported by one of said abutment brackets for pivotal movement selectively to an inoperative position and to an operative position wherein they render said first pair of abutments inoperative and occupy a position closer to said folders than said first pair of abutments do to accommodate articles of reduced height to likewise limit the upward movement of the article as said folders are operating at the underside of the article.

15. In an apparatus for wrapping an article in a sheet of heat sensitive wrapping material; a frame; a source of power; an elevator mechanism adapted to receive the article being wrapped with a sheet of wrapping material secured about it with two ends of the wrapping material extending laterally from two sides of the article, said elevator mechanism being slidably supported by said frame for vertical movement and connected to be actuated by said source of power in an upward movement to raise the article on it to an upper position; a pair of draw arm brackets supported by said frame in spaced relationship for lateral pivotal movement toward and away from each other; a draw arm mounted on each of said draw arm brackets to extend outwardly therefrom in parallel spaced relationship for movement toward and away from each other with the pivotal movement of said brackets to vary their spacing for accommodating articles of different width so that said draw arms may be spaced to correspond substantially with the width of the article being wrapped, said draw arms being located in the path of movement of the article as it is being moved upwardly by said elevator mechanism so that the article passes between said draw bars in its upward movement to cause the extending ends of the wrapping material to be drawn downwardly relative to the article; a pair of heated folders oppositely supported by said frame for simultaneous movement toward and away from each other and connected to be actuated in their movement by said source of power in a path of travel to move to the underside of the article to contact the downwardly extending ends of the wrapping material and move them to the underside of the article to envelop the article in the sheet of wrapping material and seal them in position by the application of heat to the underside of the article while the article is in its upper position as established by said elevator mechanism; a pair of abutment brackets carried by said frame; a first pair of abutments each fixedly mounted on one of said abutment brackets to be disposed in parallel spaced relationship with their spacing accommodating the width of the article being wrapped and in position to limit the upward movement of the article as said folders are operating at the underside of the article to enable the folders to draw the wrapping material tightly along the underside of the article; a second pair of abutments each pivotally supported by one of said abutment brackets for pivotal movement selectively to an inoperative position and to an operative position wherein they render said first pair of abutments inoperative and occupy a position closer to said folders than said first pair of abutments do to accommodate articles of reduced height to likewise limit the upward movement of the article as said folders are operating at the underside of the article; a support arm slidably supported by said frame for vertical movement and connected to be raised by said elevator movement while it is disposed underneath the article being wrapped while the latter is being raised by said elevator mechanism; and support arm retaining means mounted on said frame and connected to be actuated by said source of power into engagement with said support arm to retain said support arm in its upper position after said elevator mechanism moves downwardly, said support arm serving in its upper position to support the article being wrapped after it is released by said elevator mechanism and while said folders are operating to fold the extending ends of the wrapping material to the underside of the article.

16. In an apparatus for wrapping an article in a sheet of heat sensitive wrapping material; a prewrap table; a tray resting on said table for containing the sheets of wrapping material; a hot plate operably supported adjacent to an edge of said table so that the operator may place a sheet of the wrapping material about the article to be wrapped and fuse two diagonally opposite corners of the wrapping material together at the underside of the article by the application of heat from said hot plate, leaving the other two diagonally opposite corners of the wrapping material extending outwardly from two sides of the article; a folding mechanism operably connected to fold the two extending corners of said wrapping material to the underside of the article; a conveyor mounted in position to receive the article with a sheet of wrapping material placed about it from said table and convey it to said folding mechanism for operation upon by said folding mechanism; a second hot plate supported adjacent to said folding mechanism on the side opposite said conveyor for fusing the corners of the wrapping material that were operated upon by said folding mechanism to secure these corners at the underside of the article to seal the package; and a transfer mechanism operably connected to transfer the article from said folding mechanism to said second hot plate for fusing the corners of the wrapping material at the underside of the article to seal the package.

17. In an apparatus for wrapping an article in a sheet of heat sensitive wrapping material; a source of power; a table; a tray resting on said table for containing the sheets of wrapping material; a first hot plate operably supported adjacent to an edge of said table so that the operator may place a sheet of the wrapping material about the article to be wrapped with two diagonally opposite corners of the wrapping material overlapping at the underside of the article and momentarily place the underside of the article with the two diagonally opposite corners of the wrapping material overlapping thereat into contact with said first hot plate to apply heat to the two diagonally opposite corners of the wrapping material for fusing them together at the underside of the article and leaving the other two diagonally opposite corners of the wrapping material extending outwardly from two sides of the article; folding means connected to be actuated by said source of power and operable when actuated to fold the two extending corners of said wrapping material downwardly and to the underside of the article; a second hot plate supported adjacent to said folding means for receiving the article to be wrapped after it has been operated upon by said folding means for fusing together the corners of the wrapping material that were operated upon by said folding means to secure these corners at the underside of the article to seal the package; and transfer means connected to be actuated by said source of power and operable to receive the article with a sheet of wrapping material placed about it and transfer it from a location adjacent to said table to said folding means for operation upon by said folding means and from said folding means to said second hot plate for fusing the corners of the wrapping material at the underside of the article to seal the package.

18. In an apparatus for wrapping an article in a sheet of heat sensitive wrapping material; a source of power; a table; a tray resting on said table for containing the sheets of wrapping material; a first hot plate operably supported adjacent to an edge of said table so that the operator may place a sheet of wrapping material about the article to be wrapped with two diagonally opposite corners of the wrapping material overlapping at the underside of the article and momentarily place the underside of the article with the two diagonally opposite corners of the wrapping material overlapping thereat into contact with said first hot plate to apply heat to the two diagonally opposite corners of the wrapping material for fusing them together at the underside of the article and leaving the other two diagonally opposite corners of the wrapping material extending outwardly from two sides of the article; folding means connected to be actuated by said source of power and operable when actuated to fold the two extending corners of the wrapping material to the underside of the article; a conveyor connected to be actuated by said source of power and mounted in position to receive the article with a sheet of wrapping material placed about it at a location adjacent to said first hot plate and convey the article to said folding means for operation upon by said folding means; a second hot plate supported adjacent to said folding means on the side opposite the location of said conveyor for receiving the article from said folding means to apply heat to the underside of the article for fusing the corners of the wrapping material that were operated upon by said folding means to secure these corners at the underside of the article to seal the package; a cooling grid supported adjacent to said second hot plate in position to receive the article from said second hot plate for dissipating the heat applied to the underside of the article by said second hot plate; and transfer means connected to be actuated by said source of power and operable when actuated to transfer the article from said folding means to said second hot plate, said transfer means being also operable to transfer the article from said second hot plate to said cooling grid after the hot plate has operated to fuse the corners of the wrapping material at the underside of the article.

19. In an apparatus for wrapping an article in a sheet of heat sensitive wrapping material; a source of power; a table; a first hot plate operably supported adjacent to an edge of said table so that the operator may place a sheet of wrapping material about the article to be wrapped with two diagonally opposite corners of the wrapping material overlapping at the underside of the article and momentarily place the underside of the article with the two diagonally opposite corners of the wrapping material overlapping thereat into contact with said first hot plate to apply heat to the two diagonally opposite corners of the wrapping material for fusing them together at the underside of the article and leaving the other two diagonally opposite corners of the wrapping material extending outwardly from two sides of the article; folding means connected to be actuated by said source of power and operable when actuated to fold the two extending corners of the wrapping material to the underside of the article; heating means associated with said folding means and operable to apply heat to the wrapping material as it is being folded by said folding means to fuse the several folds of wrapping material together at the underside of the article; a conveyor connected to be actuated by said source of power and mounted in position to receive the article with a sheet of wrapping material placed about it at a location adjacent to said first hot plate and convey the article to said folding means for operation upon by said folding means; a second hot plate supported adjacent to said folding means on the side opposite the location of said conveyor for receiving the article from said folding means to complete the folding of the extremities of the extending ends of the wrapping material at the underside of the article and apply heat to the folds at the underside of the article for fusing the folds together; a cooling grid supported adjacent to said second hot plate in position to receive the article from said second hot plate for dissipating the heat applied to the underside of the article by said second hot plate; and transfer means connected to be actuated by said source of power and operable when actuated to transfer the article from said folding means to said second hot plate, said transfer means being also operable to transfer the article from said second hot plate to said cooling grid after the hot plate has operated to fuse the corners of the wrapping material at the underside of the article.

20. In an apparatus for wrapping an article in a sheet of heat sensitive wrapping material; a source of power; a table; a tray resting on said table for containing the sheets of wrapping material; a first hot plate operably supported adjacent to an edge of said table so that the operator may place a sheet of wrapping material about the article to be wrapped with two diagonally opposite corners of the wrapping material overlapping at the underside of the article and momentarily place the underside of the article with the two diagonally opposite corners of the wrapping material overlapping thereat into contact with said first hot plate to apply heat to the two diagonally opposite corners of the wrapping material for fusing them together at the underside of the article and leaving the other two diagonally opposite corners of the wrapping material extending outwardly from two sides of the article; a pair of heated folders oppositely supported by said frame for simultaneous movement toward and away from each other and connected to be actuated in their movement by said source of power in a path of travel to move to the underside of the article to contact the outwardly extending ends of the wrapping material and move them to the underside of the article to envelope the article in the sheet of wrapping material and seal them in position by the application of heat to the underside of the article; a conveyor connected to be actuated by said source of power and mounted in position to receive the article with a sheet of wrapping material placed about it at a location adjacent to said first hot plate and convey the article to said folders for operation upon by said folders; a second hot plate supported adjacent to said folders on the side opposite the location of said conveyor for receiving the article from said folders to complete the folding of the extremities of the extending ends of the wrapping material at the underside of the article and apply heat to the folds at the underside of the article for fusing the folds together; a cooling grid supported adjacent to said second hot plate in position to receive the article from said second hot plate for dissipating the heat applied to the underside of the article by said second hot plate; and transfer means connected to be actuated by said source of power and operable when actuated to transfer the article from said folders to said second hot plate, said transfer means being also operable to transfer the article from said second hot plate to said cooling grid after the hot plate has operated to fuse the corners of the wrapping material at the underside of the article.

21. In an apparatus for wrapping an article in a sheet of heat sensitive wrapping material; a source of power; a table; a first hot plate operably supported adjacent to an edge of said table so that the operator may place a sheet of wrapping material about the article to be wrapped with two diagonally opposite corners of the wrapping material overlapping at the underside of the article and momentarily place the underside of the article with the two diagonally opposite corners of the wrapping material overlapping thereat into contact with said first hot plate to apply heat to the two diagonally opposite corners of the wrapping material for fusing them together at the underside of the article and leaving the other two diagonally opposite corners of the wrapping material extending outwardly from two sides of the article; folding means connected to be actuated by said source of power and operable when actuated to fold the two extending corners of said wrapping material downwardly and to the underside of the article; a second hot plate supported adjacent to said folding means for receiving the article to be wrapped after it has been operated upon by said folding means for fusing together the corners of the wrapping material that were operated upon by said folding means to secure these corners at the underside of the article to seal the package; and transfer means connected to be actuated by said source of power and operable to receive the article with a sheet of wrapping material placed about it and transfer it from a location adjacent to said table to said folding means for operation upon by said folding means and from said folding means to said second hot plate for fusing the corners of the wrapping material at the underside of the article to seal the package.

No references cited.